(12) United States Patent
Hong

(10) Patent No.: US 10,859,309 B2
(45) Date of Patent: Dec. 8, 2020

(54) REFRIGERATOR

(71) Applicant: LG ELECTRONICS INC., Seoul (KR)

(72) Inventor: Jinil Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 15/358,226

(22) Filed: Nov. 22, 2016

(65) Prior Publication Data
US 2017/0153055 A1    Jun. 1, 2017

(30) Foreign Application Priority Data

Nov. 27, 2015    (KR) .................. 10-2015-0167689

(51) Int. Cl.
*F25D 29/00*    (2006.01)
*F25D 23/02*    (2006.01)
*G06F 3/041*    (2006.01)

(52) U.S. Cl.
CPC ......... *F25D 29/005* (2013.01); *F25D 23/028* (2013.01); *G06F 3/0412* (2013.01); *F25D 2400/361* (2013.01)

(58) Field of Classification Search
CPC ...... F25D 29/005; F25D 23/028; G06F 3/044; G06F 3/0412
See application file for complete search history.

(56) References Cited

U.S. PATENT DOCUMENTS

| | | |
|---|---|---|
| 3,935,485 A | 1/1976 | Yoshida et al. |
| 4,056,699 A | 11/1977 | Jordan |
| (Continued) | | |

FOREIGN PATENT DOCUMENTS

| | | |
|---|---|---|
| CN | 1255665 | 6/2000 |
| CN | 1980061 | 6/2007 |
| (Continued) | | |

OTHER PUBLICATIONS

Wikipedia. Capacitive Sensing. [retrieved Feb. 13, 2020]. Retrieved from the Internet:>URL://en.wikipedia.org/wiki/Capacitive_sensing (Year: 2020).*

(Continued)

*Primary Examiner* — Larry L Furdge
*Assistant Examiner* — Alexis K Cox
(74) *Attorney, Agent, or Firm* — Ked & Associates LLP

(57) ABSTRACT

A refrigerator includes a door, a front panel that defines an external appearance of the door and is formed of a metal, a front panel hole that is formed in the front panel, a cover display that is provided on a rear surface of the front panel, a cover protrusion that extends from the cover display to an inside of the front panel hole, a touch plate that is mounted on the cover protrusion, is exposed through the front panel hole, and is formed of a metal, and a capacitive touch sensor that is arranged on a rear side of the cover display and is connected to the touch plate such that a current flows between the touch sensor and the touch plate. The touch plate has a size that is smaller than a size of the front panel hole and is spaced apart from an inner peripheral surface of the front panel hole, and the cover protrusion is formed along an inner circumference of the front panel hole to divide a section between the touch plate and the front panel.

14 Claims, 16 Drawing Sheets

(56) References Cited

U.S. PATENT DOCUMENTS

| | | |
|---|---|---|
| 5,239,152 A | 8/1993 | Caldwell et al. |
| 5,780,530 A | 7/1998 | Mizutani et al. |
| 5,923,522 A | 7/1999 | Sajna |
| 5,973,420 A | 10/1999 | Kaiserman et al. |
| 5,995,877 A | 11/1999 | Brueggemann et al. |
| 6,242,076 B1 | 6/2001 | Andriash |
| 6,265,682 B1 | 7/2001 | Lee |
| 6,421,253 B1 | 7/2002 | Ash, Jr. |
| 6,663,111 B1 | 12/2003 | Freiseisen et al. |
| 6,667,563 B2 | 12/2003 | Bae et al. |
| 7,155,317 B1 | 12/2006 | Tran |
| 7,208,960 B1 | 4/2007 | Deangelis et al. |
| 7,573,701 B2 | 8/2009 | Doberstein et al. |
| 7,869,589 B2 | 1/2011 | Tuovinen |
| 7,911,321 B2 | 3/2011 | Bingle et al. |
| 8,320,131 B2 | 11/2012 | Paleczny et al. |
| 8,371,551 B2 | 2/2013 | Jang |
| 8,384,679 B2 | 2/2013 | Paleczny et al. |
| 8,648,832 B2 | 2/2014 | Maloof et al. |
| 8,742,647 B2 | 6/2014 | Fluhrer |
| 8,922,979 B2 | 12/2014 | Fluhrer |
| 9,323,289 B2 | 4/2016 | Oohira |
| 9,448,628 B2 | 9/2016 | Tan et al. |
| 10,006,625 B2 | 6/2018 | Kim et al. |
| 10,007,385 B2 | 6/2018 | Kim et al. |
| 2002/0066971 A1 | 6/2002 | Takashi |
| 2003/0043449 A1 | 3/2003 | Takeuchi et al. |
| 2003/0110784 A1* | 6/2003 | Lee ............ F25D 29/005 62/127 |
| 2004/0011556 A1 | 1/2004 | Torii |
| 2004/0100479 A1 | 5/2004 | Nakano et al. |
| 2004/0231884 A1 | 11/2004 | Wong et al. |
| 2006/0043087 A1* | 3/2006 | Gagas ............ F24C 7/087 219/391 |
| 2006/0144056 A1* | 7/2006 | Oh ............ F25D 29/005 62/126 |
| 2006/0177212 A1 | 8/2006 | Lamborghini et al. |
| 2006/0262549 A1 | 11/2006 | Schmidt et al. |
| 2007/0051459 A1 | 3/2007 | Yamano et al. |
| 2007/0051610 A1 | 3/2007 | Weiss |
| 2007/0130965 A1 | 6/2007 | Boarman et al. |
| 2007/0246267 A1 | 10/2007 | Koottungal |
| 2008/0143684 A1 | 6/2008 | Seo |
| 2008/0165154 A1 | 7/2008 | Kim |
| 2008/0196945 A1 | 8/2008 | Konstas |
| 2008/0202912 A1 | 8/2008 | Boddie et al. |
| 2008/0257706 A1 | 10/2008 | Haag |
| 2009/0090605 A1 | 4/2009 | Arione et al. |
| 2009/0107829 A1 | 4/2009 | Heimann |
| 2009/0128375 A1 | 5/2009 | Heimann et al. |
| 2009/0306827 A1 | 12/2009 | Kim et al. |
| 2009/0322700 A1 | 12/2009 | D'Souza et al. |
| 2010/0007531 A1 | 1/2010 | Fluhrer |
| 2010/0045617 A1 | 2/2010 | Lee |
| 2010/0114011 A1 | 5/2010 | Herrmann |
| 2010/0149000 A1 | 6/2010 | Heimann |
| 2010/0216929 A1 | 8/2010 | Jung et al. |
| 2010/0219176 A1 | 9/2010 | Striegler |
| 2011/0016910 A1* | 1/2011 | Bak ............ F25D 29/00 62/449 |
| 2011/0032199 A1 | 2/2011 | Seo et al. |
| 2011/0048047 A1 | 3/2011 | Kim |
| 2011/0134627 A1 | 6/2011 | Hamlin et al. |
| 2011/0175845 A1 | 7/2011 | Honda et al. |
| 2011/0242028 A1 | 10/2011 | Lee et al. |
| 2011/0267304 A1 | 11/2011 | Simmons et al. |
| 2011/0299129 A1 | 12/2011 | Ishida et al. |
| 2012/0063108 A1 | 3/2012 | Kim et al. |
| 2012/0138336 A1 | 6/2012 | Watanabe et al. |
| 2012/0138337 A1 | 6/2012 | Kim |
| 2012/0274602 A1* | 11/2012 | Bita ............ G02B 26/001 345/174 |
| 2013/0021274 A1 | 1/2013 | Fukushima et al. |
| 2013/0067940 A1 | 3/2013 | Shim |
| 2013/0082948 A1 | 4/2013 | Ok |
| 2013/0126325 A1 | 5/2013 | Curtis et al. |
| 2013/0147751 A1 | 6/2013 | Aguilar et al. |
| 2013/0229359 A1 | 9/2013 | Wang et al. |
| 2014/0101589 A1 | 4/2014 | Hyun et al. |
| 2014/0184577 A1 | 7/2014 | Kim et al. |
| 2014/0203863 A1 | 7/2014 | Gillespie |
| 2014/0300263 A1 | 10/2014 | Sung et al. |
| 2015/0002451 A1 | 1/2015 | Um |
| 2015/0192352 A1 | 7/2015 | Sung et al. |
| 2015/0276302 A1 | 10/2015 | Roh et al. |
| 2015/0378514 A1 | 12/2015 | Keski-Jaskari |
| 2016/0003519 A1 | 1/2016 | Kim et al. |
| 2016/0105985 A1 | 4/2016 | Wang et al. |
| 2016/0117022 A1* | 4/2016 | Kim ............ G06F 3/044 345/174 |
| 2016/0178277 A1 | 6/2016 | Park |
| 2016/0205765 A1 | 7/2016 | Takagi et al. |
| 2017/0089633 A1 | 3/2017 | Kim et al. |

FOREIGN PATENT DOCUMENTS

| | | |
|---|---|---|
| CN | 101535748 | 9/2009 |
| CN | 101738051 | 6/2010 |
| CN | 101741371 | 6/2010 |
| CN | 101939605 | 1/2011 |
| CN | 102338544 | 2/2012 |
| CN | 202582565 | 12/2012 |
| CN | 103105979 | 5/2013 |
| CN | 103109135 | 5/2013 |
| CN | 105546930 | 5/2016 |
| CN | 105577156 | 5/2016 |
| DE | 297 22 565 U1 | 2/1998 |
| DE | 29722565 | 2/1998 |
| DE | 10 2009 001 412 | 9/2010 |
| EP | 2770638 | 8/2014 |
| EP | 2 789 943 | 10/2014 |
| EP | 2 975 345 | 1/2016 |
| EP | 3 007 361 | 4/2016 |
| EP | 3 037 755 | 6/2016 |
| JP | S 58-14433 | 1/1983 |
| JP | H 06-095803 | 4/1994 |
| JP | H 06-060031 | 8/1994 |
| JP | 2006-250485 | 9/2006 |
| JP | 2007-100995 | 4/2007 |
| JP | 2010-230226 | 10/2010 |
| JP | 2011-090897 | 5/2011 |
| JP | 2012-098828 | 5/2012 |
| JP | 2013-057432 | 3/2013 |
| JP | 2013-072581 | 4/2013 |
| JP | 2013-530398 | 7/2013 |
| JP | 2013-181734 | 9/2013 |
| JP | 2014-031958 | 2/2014 |
| JP | 2014-031978 | 2/2014 |
| JP | 2014-040939 | 3/2014 |
| JP | 2014-055700 | 3/2014 |
| JP | 2014-085024 | 5/2014 |
| JP | 2014-137147 | 7/2014 |
| JP | 2014-196933 | 10/2014 |
| KR | 10-2000-0031593 | 6/2000 |
| KR | 10-0578400 | 5/2006 |
| KR | 10-2006-0095696 | 9/2006 |
| KR | 10-0634365 | 10/2006 |
| KR | 10-0663866 | 1/2007 |
| KR | 10-0756451 | 9/2007 |
| KR | 10-2008-0045044 | 5/2008 |
| KR | 10-0866342 | 10/2008 |
| KR | 10-2009-0090518 | 8/2009 |
| KR | 10-2010-0050190 | 5/2010 |
| KR | 10-2010-0074034 | 7/2010 |
| KR | 10-2010-0095274 | 8/2010 |
| KR | 10-2011-0009438 | 1/2011 |
| KR | 10-1132463 | 3/2012 |
| KR | 10-2012-0048655 | 5/2012 |
| KR | 10-2012-0050070 | 5/2012 |
| KR | 10-2012-0116207 | 10/2012 |
| KR | 10-1237564 | 2/2013 |
| KR | 10-2013-0040058 | 4/2013 |
| KR | 10-2014-0121753 | 10/2014 |

(56) References Cited

FOREIGN PATENT DOCUMENTS

| WO | WO 2008/069352 | 6/2005 |
|---|---|---|
| WO | WO 2007/105950 | 9/2007 |
| WO | WO 2008/069352 | 6/2008 |
| WO | WO 2009/104859 | 8/2009 |
| WO | WO 2010-015749 | 2/2010 |
| WO | WO 2011/081279 | 7/2011 |
| WO | WO 2014/034434 | 3/2014 |
| WO | WO 2014/168391 | 10/2014 |
| WO | WO 2014/208585 | 12/2014 |
| WO | WO 2015-128990 | 9/2015 |
| WO | WO 2016/072802 | 5/2016 |

OTHER PUBLICATIONS

Chinese Office Action dated Jul. 27, 2018 (English Translation).
European Search Report dated Jun. 19, 2018.
Australian Office Action dated Aug. 22, 2016 issued in Application No. 2016201233.
Korean Notice of Allowance dated Sep. 13, 2016 issued in Application No. 10-2014-0189150.
European Search Report dated Sep. 19, 2016 issued in Application No. 16161569.5.
European Search Report dated Jun. 20, 2018.
U.S. Office Action issued in U.S. Appl. No. 14/931,776 dated Aug. 8, 2018.
United States Office Action dated Oct. 5, 2017 issued in U.S. Appl. No. 14/977,615.
U.S. Notice of Allowance issued in U.S. Appl. No. 14/977,605 dated Aug. 29, 2018.
U.S. Office Action issued in U.S. Appl. No. 15/952,941 dated Aug. 30, 2018.
Chinese Office Action dated Jul. 3, 2017 issued in Application No. 201510671495.5 (with English translation).
Chinese Office Action dated Jul. 3, 2017 issued in Application No. 201510684487.4 (with English translation).
U.S. Ex Parte Quayle Action dated Sep. 28, 2017 issued in co-pending U.S. Appl. No. 14/977,623.
International Search Report dated Mar. 2, 2016 issued in Application No. PCT/KR2015/011956 (full English text).
Korean Office Action dated Mar. 30, 2018 issued in Application No. 10-2016-7034720.
United States Office Action dated Apr. 24, 2018 issued in U.S. Appl. No. 15/305,261.
European Office Action dated Sep. 18, 2018 issued in EP Application No. 15 191 174.0.
Japanese Office Action dated Dec. 12, 2017 issued in Application No. 2017-527531.
Chinese Office Action dated Jan. 17, 2018 issued in Application No. 201510964492.0.
Chinese Office Action dated Jan. 25, 2018 issued in Application No. 201510979959.9.
United States Office Action dated Feb. 28, 2018 issued in U.S. Appl. No. 14/931,776.
United States Ex Parte Quayle Office Action dated Feb. 28, 2018 issued in U.S. Appl. No. 14/977,572.
U.S. Office Action dated Mar. 24, 2017 issued in co-pending U.S. Appl. No. 14/931,776.
English machine translation of WO 2014/208585 (previously cited Nov. 29, 2016).
Chinese Office Action dated Sep. 29, 2017 issued in Application No. 201510977160.6 (with English translation).
United States Office Action dated Oct. 5, 2017 issued in U.S. Appl. No. 14/921,681.
Korean Office Action dated Nov. 9, 2015 issued in Application No. 10-2014-0154781.
Korean Office Action dated Dec. 18, 2015 issued in Application No. 10-2014-0145534.
Korean Office Action dated Jan. 28, 2016 issued in Application No. 10-2014-0189150.
Korean Office Action dated Mar. 9, 2016 issued in Application No. 10-2015-0063758.
European Search Report dated Mar. 22, 2016 issued in Application No. 15192563.3.
Korean Office Action dated Apr. 4, 2016 issued in Application No. 10-2014-0186531.
European Search Report dated Apr. 25, 2016 issued in Application No. 15200775.3.
European Search Report dated May 3, 2016 issued in Application No. 15201832.1.
European Search Report dated May 13, 2016 issued in Application No. 15201205.0.
European Search Report dated May 31, 2016 issued in Application No. 15191174.0.
European Search Report dated Jun. 15, 2016 issued in Application No. 15201840.4.
Korean Notice of Allowance dated Aug. 31, 2016 issued in Application No. 10-2014-0186531.
Korean Notice of Allowance dated Aug. 31, 2016 issued in Application No. 10-2014-0189144.
U.S. Office Action dated Sep. 5, 2017 issued in co-pending U.S. Appl. No. 14/931,776.
U.S. Office Action dated Feb. 5, 2019 issued in U.S. Appl. No. 14/977,588.
Korean Notice of Allowance dated Jun. 28, 2016 issued in Application No. 10-2015-0063758 (with English Translation).
U.S. Office Action dated Feb. 8, 2017 issued in co-pending U.S. Appl. No. 15/060,974.
U.S. Notice of Allowance dated Apr. 12, 2017 issued in co-pending U.S. Appl. No. 15/060,974.
United States Office Action dated Jan. 11, 2019 issued in co-pending related U.S. Appl. No. 16/199,992.
Korean Office Action dated Jan. 31, 2017 issued in Application No. 10-2015-0167689.
Korean Notice of Allowance dated Apr. 6, 2017 issued in Application No. 10-2015-0167689.
U.S. Office Action dated Nov. 17, 2017 issued in co-pending U.S. Appl. No. 14/977,605.
Chinese Office Action dated Oct. 25, 2017 issued in Application No. 201510977666.7 (with English translation).
U.S. Office Action dated May 19, 2017 issued in U.S. Appl. No. 14/977,623.
U.S. Office Action dated Jun. 28, 2019 issued in U.S. Appl. No. 16/433,631.
U.S. Office Action dated Jun. 7, 2019 issued in U.S. Appl. No. 16/199,992.
U.S. Notice of Allowance dated Oct. 8, 2019 issued in U.S. Appl. No. 16/199,992.
European Search Report dated Apr. 24, 2020 issued in EP Application No. 20153594.5.
U.S. Appl. No. 16/532,559, filed Aug. 6, 2019.
U.S. Appl. No. 16/721,163, filed Dec. 19, 2019.
U.S. Appl. No. 16/665,346, filed Oct. 28, 2019.
U.S. Pat. No. 9,739,527, Aug. 22, 2017, U.S. Appl. No. 15/060,974, filed Mar. 4, 2016.
U.S. Appl. No. 14/921,681, filed Oct. 23, 2015.
U.S. Appl. No. 14/931,776, filed Nov. 3, 2015.
U.S. Appl. No. 14/977,572, filed Dec. 21, 2015.
U.S. Appl. No. 14/977,588, filed Dec. 21, 2015.
U.S. Appl. No. 14/977,605, filed Dec. 21, 2015.
U.S. Appl. No. 14/977,615, filed Dec. 21, 2015.
U.S. Appl. No. 14/977,623, filed Dec. 21, 2015.
U.S. Pat. No. 10,006,625, Jun. 26, 2018, U.S. Appl. No. 14/977,623, filed Dec. 21, 2015.
U.S. Pat. No. 10,007,385, Jun. 26, 2018, U.S. Appl. No. 14/921,681, filed Oct. 23, 2015.
U.S. Pat. No. 10,055,038, Aug. 21, 2018, U.S. Appl. No. 14/977,615, filed Dec. 21, 2015.
U.S. Pat. No. 10,180,748, Jan. 15, 2019, U.S. Appl. No. 14/977,605, filed Dec. 21, 2015.
U.S. Appl. No. 15/305,261, filed Oct. 19, 2016.
U.S. Appl. No. 15/952,550, filed Apr. 13, 2018.
U.S. Appl. No. 15/952,941, filed Apr. 13, 2018.

(56) References Cited

OTHER PUBLICATIONS

U.S. Appl. No. 16/199,992, filed Nov. 26, 2018.
U.S. Appl. No. 16/433,631, filed Jun. 6, 2019.
U.S. Appl. No. 15/358,226, filed Nov. 22, 2016.
U.S. Appl. No. 15/060,974, filed Mar. 4, 2016.
U.S. Appl. No. 15/969,901, filed May 3, 2018.
United States Office Action dated Jul. 25, 2018 issued in U.S. Appl. No. 14/977,588.
Korean Notice of Allowance dated Sep. 30, 2016 issued in Application No. 10-2014-0188229.
U.S. Office Action dated May 25, 2018 issued in co-pending U.S. Appl. No. 14/977,605.
Korean Office Action dated Jul. 18, 2016.

* cited by examiner

REFRIGERATOR

CROSS-REFERENCE TO RELATED APPLICATION(S)

The application claims priority under 35 U.S.C. § 119 and 35 U.S.C. § 365 to Korean Patent Application No. 10-2015-0167689, filed in Korea on Nov. 27, 2015, whose entire disclosure is hereby incorporated by reference.

BACKGROUND

1. Field

The present disclosure relates to a refrigerator.

2. Background

In general, a touch sensor assembly used in home appliances may generate a signal for operations of the home appliance by recognizing a push operation of the user. The touch sensor may include a capacitive sensor and a resistive cell sensor to detect a touch operation, process signals, and operate the home appliance. In recent years, home appliances may have steel or glass exteriors and/or exteriors coated with similar materials to improve an external appearances. Touch sensor assemblies for touch operations on exterior surfaces have also been developed.

A refrigerator may be an electric device that stores foods in a storage space at low temperature. The storage space may be opened and closed by a door. The refrigerator may cool the storage space by using cool air generated through heat exchange and a refrigerant to preserve the stored foods in an optimum state.

An interior of the refrigerator may include a refrigerator compartment and a freezer compartment. Reception members such as shelves, drawers, and baskets, may be provided in the interior of the refrigerator compartment and the freezer compartment. Further, the refrigerator compartment and the freezer compartment may be closed by doors. The refrigerators are variously classified according to an arrangement of the refrigerator compartment and the freezer compartment.

As refrigerators have recently become luxurious and multifunctional, refrigerators having an improved external appearance and equipped with various convenience features have been released. For example, refrigerator exteriors may be formed of steel or glass or coated of similar materials, and may employ various structures of displays and user interfaces or manipulation units for facilitating manipulations of the user.

BRIEF DESCRIPTION OF THE DRAWINGS

Embodiments will be described in detail with reference to the following drawings in which like reference numerals refer to like elements, and wherein:

FIG. 8 is a sectional view taken along line 8-8' of FIG. 4;

DETAILED DESCRIPTION

Figure 1:
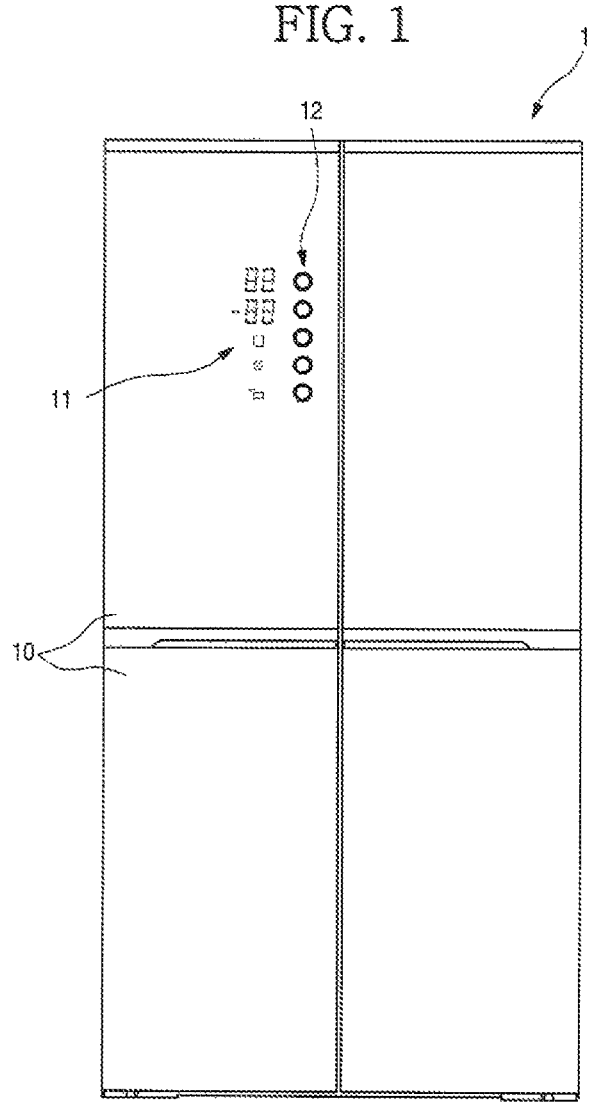
FIG. 1 is a front view of a refrigerator according to an embodiment of the present disclosure.

As Illustrated in FIG. 1, an external shape of the refrigerator 1 according to an embodiment of the present disclosure may be defined by a cabinet that defines a storage space and refrigerator doors 10 that are mounted on the cabinet to open and close the storage space. The storage space may be partitioned into left and right sections and/or upper and lower sections, and a plurality of refrigerator doors 10 that open and close the sections may be provided at an opened front surface of the cabinet. The refrigerator doors 10 may open and close the storage space in a sliding or rotating manner, and may define an external appearance of a front surface of the refrigerator 1 in a closed state.

Further, a display window (or display area) 11 and a manipulation part may be provided on one side of the plurality of refrigerator doors 10 at a height to be easily manipulated and identified by the user. The display window 11 may be adapted to display an operational state of the refrigerator 1 to a user. The display window 11 may express a symbol or a number, light may be irradiated from an interior of the refrigerator door 10 and pass through the display window 11 to allow the user to verify the symbol or number from the outside. The display window 11 may generally refer to a hole or a transparent part through which light may pass.

The manipulation part may include a plurality of touch plates 12 that are touched by the user to operate the refrigerator 1. The touch plates 12 may be provided on an area of the front surface of the refrigerator door 10 to detect a push operation. The touch plates 12 may be defined by various methods including surface processing such as printing or etching for transmission of light.

Figure 2:
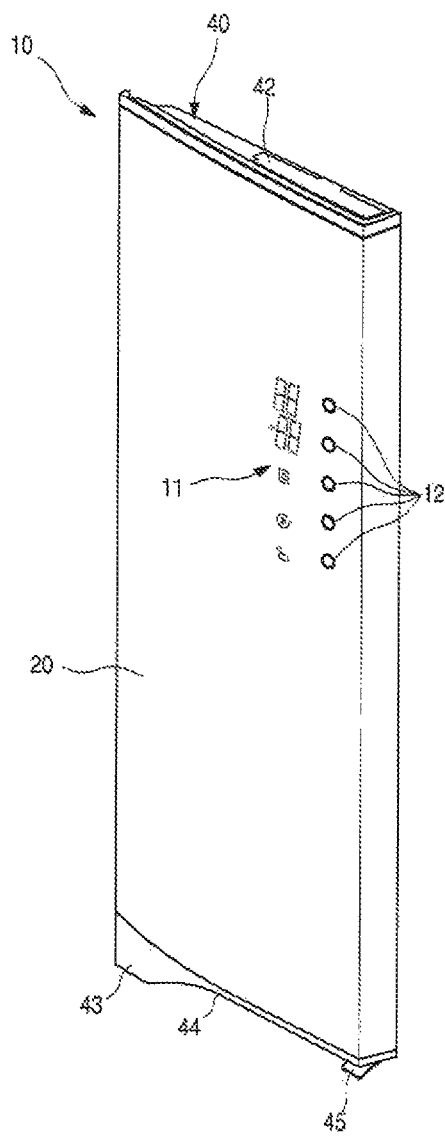
FIG. 2 is a perspective view of a refrigerator door according to an embodiment of the present disclosure.
Figure 3:
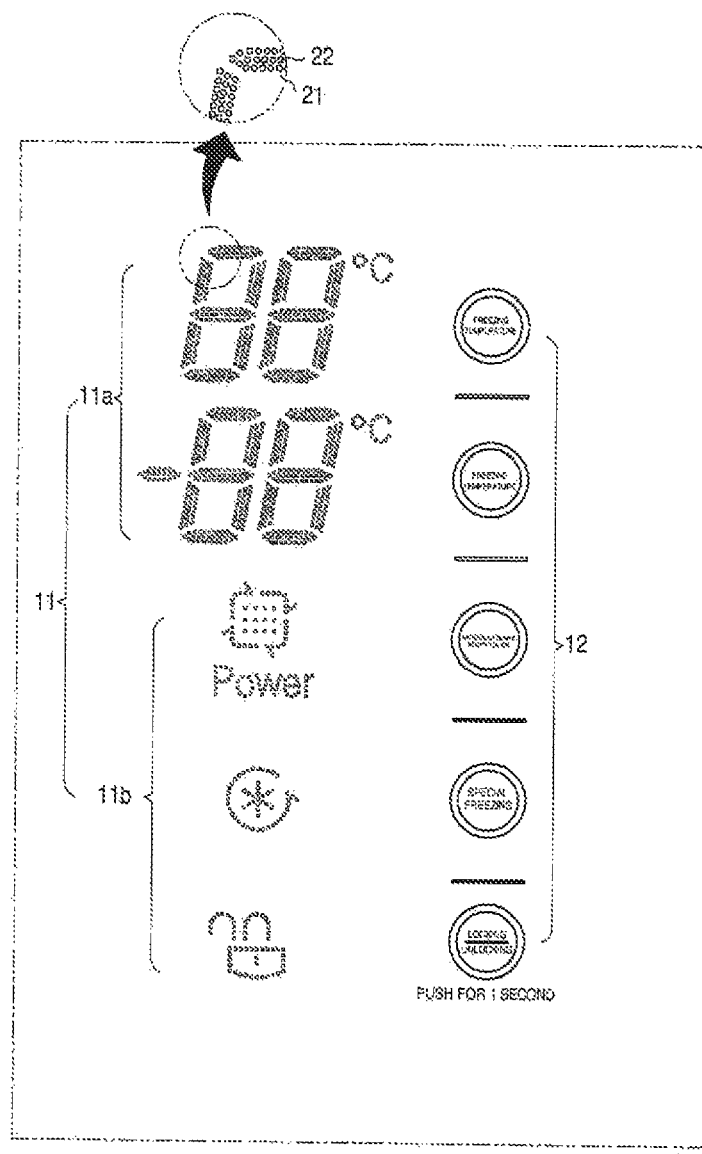
FIG. 3 illustrates a display window and a manipulation part of the refrigerator door.

As illustrated in FIGS. 2 and 3, an overall external appearance of the refrigerator door 10 may be defined by a front panel 20. Deco members 40 and 43 may be provided at an upper end and a lower end of the front panel 20 respectively, and a door liner 30 (FIG. 5) may define a rear external appearance of the refrigerator door 10. The front panel 20 may define a front surface of the refrigerator door 10, and may be a plate formed of stainless steel. Further, the front panel 20 may be implemented as an exterior or external member in home appliances other than a refrigerator.

The front panel 20 may be formed of a metal or a metallic material other than stainless steel, and/or may be formed of glass or plastic if necessary. The front panel 20 may define a portion of a side surface of the refrigerator door 10 as well as the front surface. A fingerprint prevention processing or hair line processing may be further provided on a surface of the front panel 20.

The display window 11 may be defined by a plurality of first through-holes 21 that are arranged in an area of the front panel 20. The first through-holes 21 may form a number display part (or number display) 11a that displays numbers and a symbol display part (or symbol display) 11b that displays a symbol, a letter, or a picture are defined.

The number display part 11a may be formed by arranging a set of first through-holes 21 in a shape of seven segments. The number display part 11a may be provided in an upper part and a lower part of the display window 11 to independently display temperatures of a refrigerator compartment and a freezer compartment. Of course, the number display part 11a may display other information that may be expressed by numbers, in addition to temperature information, and may selectively display information based on manipulation of the manipulation part.

Further, the symbol display part 11b may be formed below the number display part 11a. The symbol display part 11b may display an operational state of the refrigerator 1 with a symbol or a picture, and a set of first through-holes 21 may have a corresponding shape such that the user may intuitively recognize the operational state of the refrigerator 1.

For example, in the symbol display part 11b of FIG. 3, the symbol display part 11b may be expressed in a lock shape to display a locking state, a filter shape to display an operation of a microorganism removal or deodorization function, and a rotating fan shape to display a rapid freezing function. Of course, various shapes may be expressed by the symbol display part 11b, and various numbers of the symbol display parts 11b may be formed.

The display window 11 may correspond to an arrangement of second through-holes 220 (see FIG. 6), which will be described below, such that light irradiated from an LED 320 (see FIG. 6) of a display assembly 300 may pass through the display window 11. The first through-holes 21 may have a minute size through laser processing or etching. A size of the first through-holes 21 may be configured such that the first through-holes 21 are not easily identified or visible when light does not pass through the first through-holes 21.

Although FIG. 3 is illustrated such that the number display part 11a and the symbol display part 11b are clearly viewed on the drawing to illustrate the plurality of first through-holes 21, the number display part 11a and the symbol display part 11b cannot be easily distinguished visibly from far away because the sizes of the first through-holes 21 are actually minute. In the number display part 11a, only the first through-holes 21 through which light is irradiated according to an operation of seven segments may be displayed on the front panel 20 so as to display numbers, while those through-holes 21 that are not illuminated cannot be easily distinguished.

The symbol display part 11b may be identified from the outside when light is irradiated to the symbol display part 11b by a corresponding LED 320 being turned on based on a corresponding function. The symbol display part 11b cannot be easily distinguished while the LED 320 is turned off. Due to the small size of the first through-holes 21, the areas of the number display part 11a and the symbol display part 11b may not be readily seen when light is not emitted through the first through-holes 21. Other elements may not be arranged on a front external appearance of the refrigerator door 10, giving the front panel 20 and the refrigerator door 10, formed of a metal plate a simple and luxurious aesthetic feeling.

Meanwhile, a sealing member (or sealant) 22 may be filled in an interior of the first through-holes 21. The sealing member 22 may prevent the first through-holes 21 from being blocked by foreign substances. The sealing member 22 may be formed of a material, such as silicon or epoxy, which blocks the first through-holes 21 but transmits light. Further, because the insides of the first through-holes 21 are filled by the sealing member 22, the machined surfaces of the first through-holes 21 may be prevented from being corroded.

The sealing member 22 may fill the insides of the first through-holes 21 through a separate process. If necessary, during coating a surface of the front panel 20, the plurality of first through-holes 21 may be blocked by filling the first through-holes 21 with the sealing member 22 or attaching the sealing member 22 in the form of a sheet. As such, a fingerprint coating liquid and/or a diffusion sheet of the front panel 20 may function as the sealing member 22.

Figure 8:
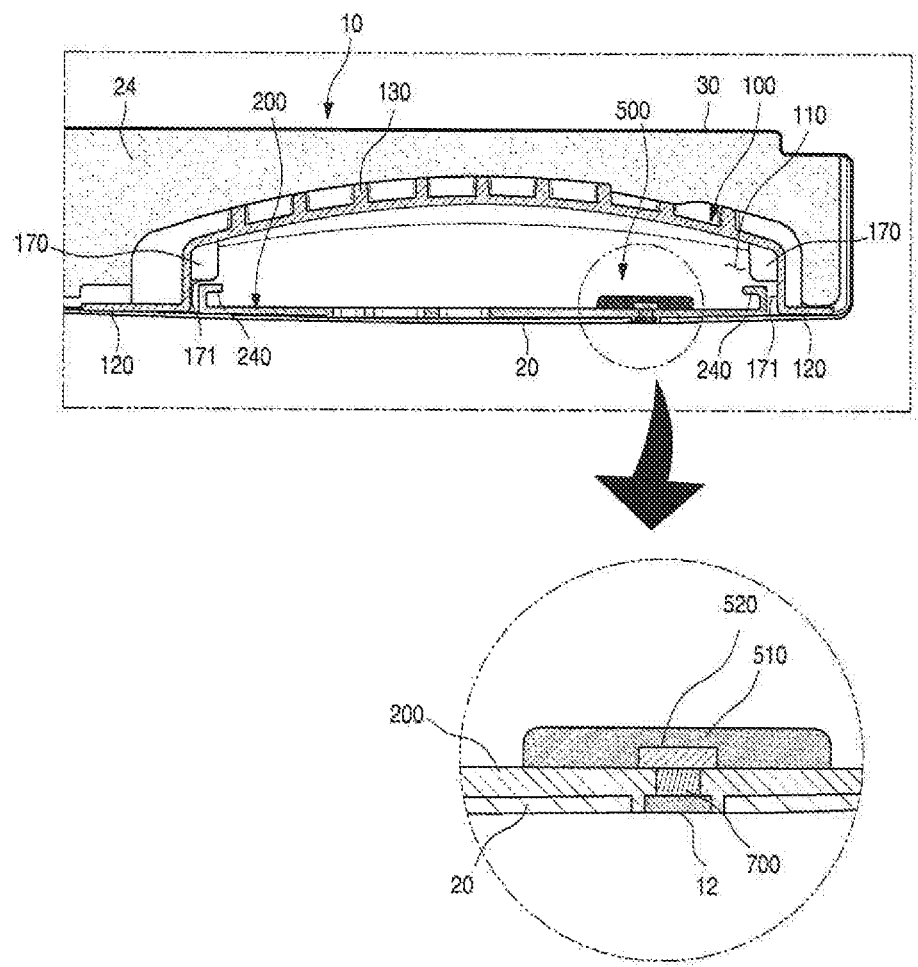
FIG. 8 is an exploded perspective view illustrating a coupling structure of a touch sensor assembly, a cover display, a display assembly, a frame display, and a frame according to an embodiment of the present disclosure.

The manipulation part may include a plurality of touch plates 12 through which the user may perform a touch operation. The touch plates 12 display an area. A touch sensor assembly 500 may detect a touch on the area when the user touches the touch plate 12. Accordingly, when the user touches the touch plate 12, a sensor 520 (see FIG. 8) provided in the touch sensor assembly 500 may be manipulated.

The sensor 520 may be a capacitive sensor that detects a change in static electricity. Further, the sensor 520 may be connected to the touch plate 12 such that a current by static electricity is delivered from the touch plate 12 to the sensor 520. Accordingly, when the user touches the touch plate 12, the sensor 520 may detect a change in static electricity to recognize a touch.

The touch plate 12 may be separate from the front panel 20, but may be formed of the same material as that of the front panel 20 such that the user feels as though the touch plate 12 is integrally formed with the front panel 20. The touch plate 12 may display a letter or a symbol such that the user intuitively understands and manipulates the corresponding function of the touch plate 12. Further, because the touch plate 12 is separate from the front panel 20, a peripheral end of the touch plate 12 may allow the user to distinguish a touchable area. Accordingly, the user may recognize the touch plate 12 effectively.

Figure 4:
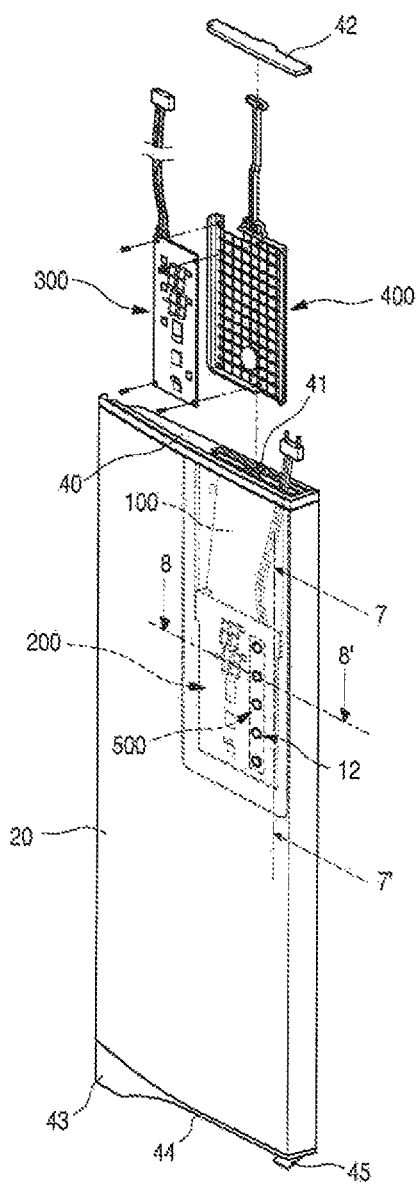
FIG. 4 is an exploded perspective view illustrating a mounting structure of a display assembly of the refrigerator door.
Figure 5:
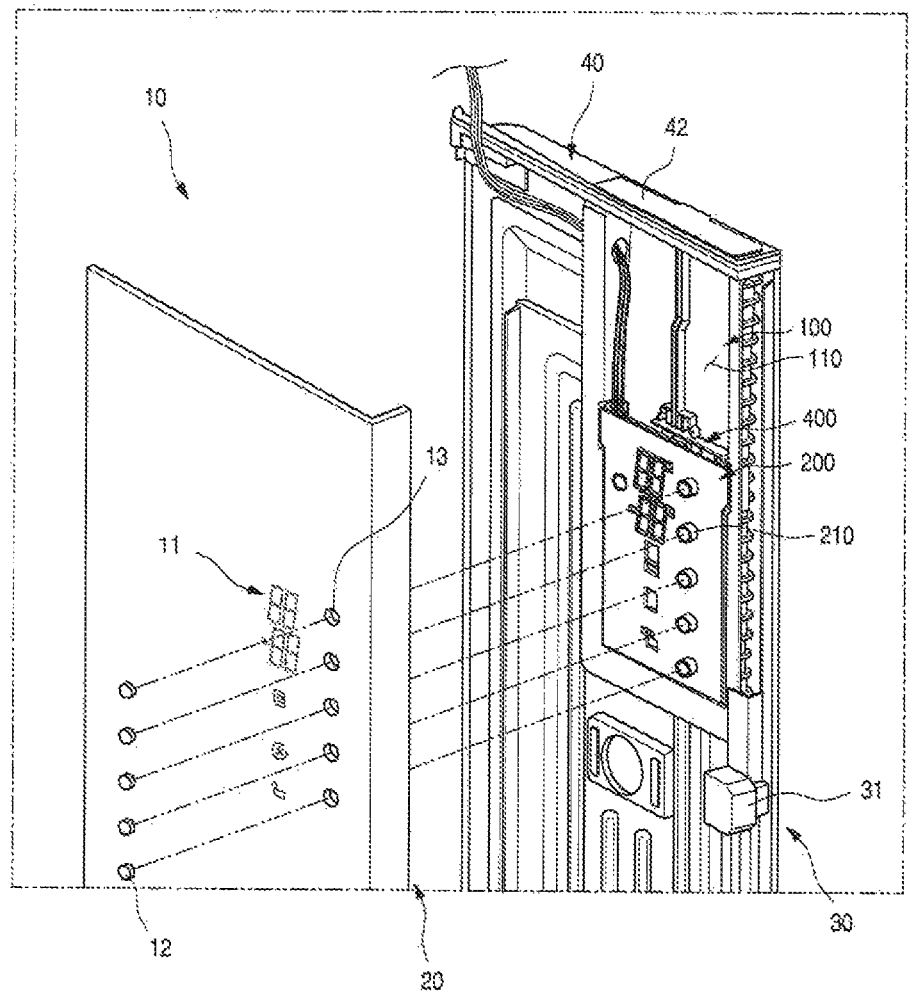
FIG. 5 is an exploded perspective view illustrating that the front panel of the refrigerator door is separated.

As illustrated in FIGS. 4 and 5, the door liner 30 may be coupled to the front panel 20, and define a rear surface of the door 10 that faces an inside of the storage space. The door liner 30 may be injection-molded of plastic, and may provide a structure in which a gasket is arranged or on which a basket is mounted, along a periphery of the door liner 30. Further, the door liner 30 may define a space between the door liner 30 and the front panel 20 when being coupled to the front panel 20, and an expandable liquid that forms an insulating member 24 may be filled in the space.

A frame 100 may be attached to a rear surface of the front panel 20. The frame 100 may provide a separate space that is not filled with the expandable liquid in the interior of the refrigerator door 10. The frame 100 may provide a space in which a cover display 200, a display assembly 300, a touch sensor assembly 500, and a frame display 400 are accommodated. Although the display assembly 300 and the touch sensor assembly 500 may not be provided as separate configurations but may be integrally formed with each other, an embodiment in which the display assembly 300 and the touch sensor assembly 500 are provided as separate configurations will be described below in detail.

The deco members 40 and 43 may define upper and lower external appearances of the refrigerator door 10, and may shield opened upper and lower ends of the refrigerator door 10, which are formed when the front panel 20 and the door liner 30 are coupled to each other. An insertion hole 41 and an insertion hole cover 42 that opens and closes the insertion hole 41 may be provided in the upper deco member 40 of the refrigerator door 10. The insertion hole 41 may pass through the deco member 40, and may be communicated with a space in which the frame 100 is formed. Further, the insertion hole 41 may have a size that is large such that the frame display 400 may be inserted through the insertion hole 41 to be situated on a vertically upper side of the cover display 400.

A hinge hole may be formed on one side of the deco member 40. A rotating shaft of the refrigerator door 10 may be mounted in the hinge hole. Further, an electric wire that is guided inside the frame 100 through the hinge hole may enter and exit from the frame 100 and may be connected to a power supply of the cabinet.

The deco member 43 on the lower side of the refrigerator door 10 may be provided with a door handle 44. The door handle 44 may be recessed in a pocket form such that the refrigerator door 10 may be rotated. Further, the deco member 43 on the lower side of the refrigerator door 10 may include a lever 45 for opening and closing the refrigerator door 10, and a latch assembly 31 may be driven through manipulation of the lever 45 such that maintenance of an opened or closed state of the refrigerator door 10 may be selected.

The cover display 200 may be mounted on a rear surface of the front panel 20. The cover display 200 may guide mounting of the display assembly 300 and the touch sensor assembly 500.

A front panel hole 13 may pass through the front panel 20. The front panel hole 13 may define a passage that connects the touch plate 12 and the touch sensor assembly 500, and may be formed at a location corresponding to the touch plate 12.

The front panel hole 13 may guide a mounting location of the cover display 200. A cover protrusion 210 that protrudes forward may be formed in the cover display 200, and the cover protrusion 210 may be inserted into the front panel hole 13. While the cover protrusion 210 is inserted into the front panel hole 13, the cover display 200 may be attached to a rear surface of the front panel 20 using an adhesive. Of course, in addition to the method of attaching the cover display 200 to the front panel 20 by an adhesive, various methods for firmly fixing the cover display 200 may be implemented.

While the cover protrusion 210 is inserted into the front panel hole 13, the cover display 200 may be located at an intended precise location of the rear surface of the front panel 20. The cover protrusion 210 and the front panel hole 13 may guide a mounting location of the cover display 200.

A precise location of the cover display 200 may refer to a location at which a second through-hole 220 formed in the display 200 is precisely aligned with a first through-hole 21 formed in the front panel 20. The first through-hole 21 may be arranged inside the second through-hole 220 to be aligned with the second through-hole 220 such that light irradiated from the LED 320 of the display assembly 300 is emitted to the outside without being blocked.

To achieve this, the cover protrusion 210 may be formed at a location corresponding to the front panel hole 13 while being situated adjacent to the second through-hole 220. Further, the cover protrusion 210 may be formed in a shape corresponding to the front panel hole 13 such that an integral feeling may be provided. The front panel hole 13 and the touch plate 12 may have a circular or polygonal shape.

The cover protrusion 210 may have a size corresponding to the size of the front panel hole 13. Accordingly, when the cover protrusion 210 is inserted into the front panel hole 13, an outer peripheral surface of the cover protrusion 210 may be adhered to an inner peripheral surface of the front panel hole 13.

The number of the cover protrusions 210 may correspond to the number of the front panel holes 13. A plurality of cover protrusions 210 and a plurality of front panel holes 13 may be provided. Because the plurality of cover protrusions 210 of the cover display 200 are inserted into the corresponding front panel holes 13, mounting locations of the cover protrusions 210 may be guided to the front panel 20 more stably while the cover protrusions 210 are not shaken.

If the cover display 200 is mounted on the front panel 20, the first through-hole 21 may be situated inside the corresponding second through-hole 220. Further, the cover display 200 may be accommodated inside the frame 100 while being mounted on the front panel 20.

The touch sensor assembly 500 may be directly mounted on the rear surface of the cover display 200 and provided in the interior of the frame 100. After the touch sensor assembly 500 is mounted on the cover display 200, the display assembly 300 may be inserted into an interior space of the frame 100 through the insertion hole 41 while being mounted on the frame display 400.

If the frame display 400 is completely inserted, the display assembly 300 may be situated inside the cover display 200. Further, the LED 320 may correspond to the second through-hole 220 of the cover display 200, and light irradiated by the LED 320 may pass through the second through-hole 220 and the first through-hole 21 of the display window 11 and may be irradiated to the outside.

Figure 6:
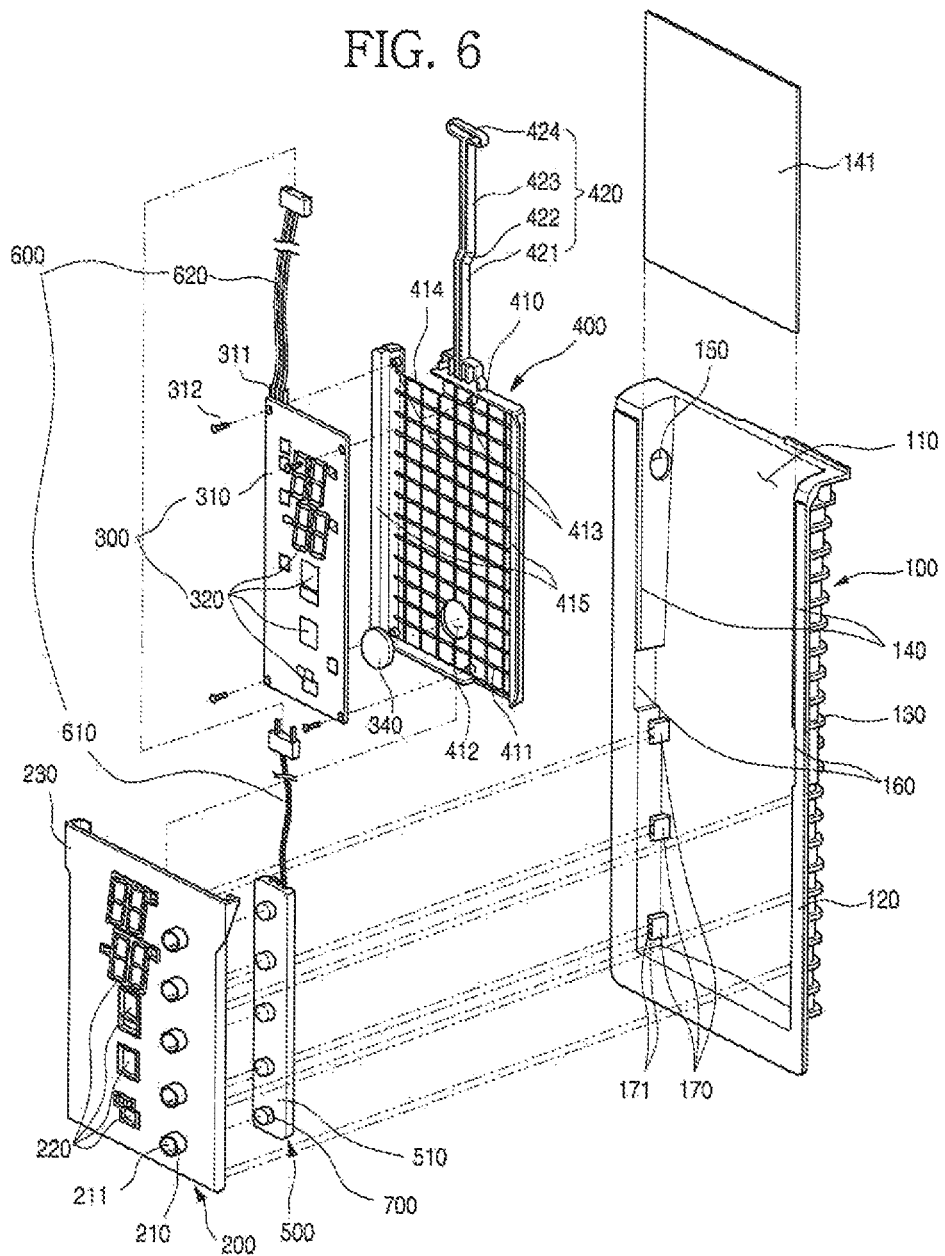
Figure 7:
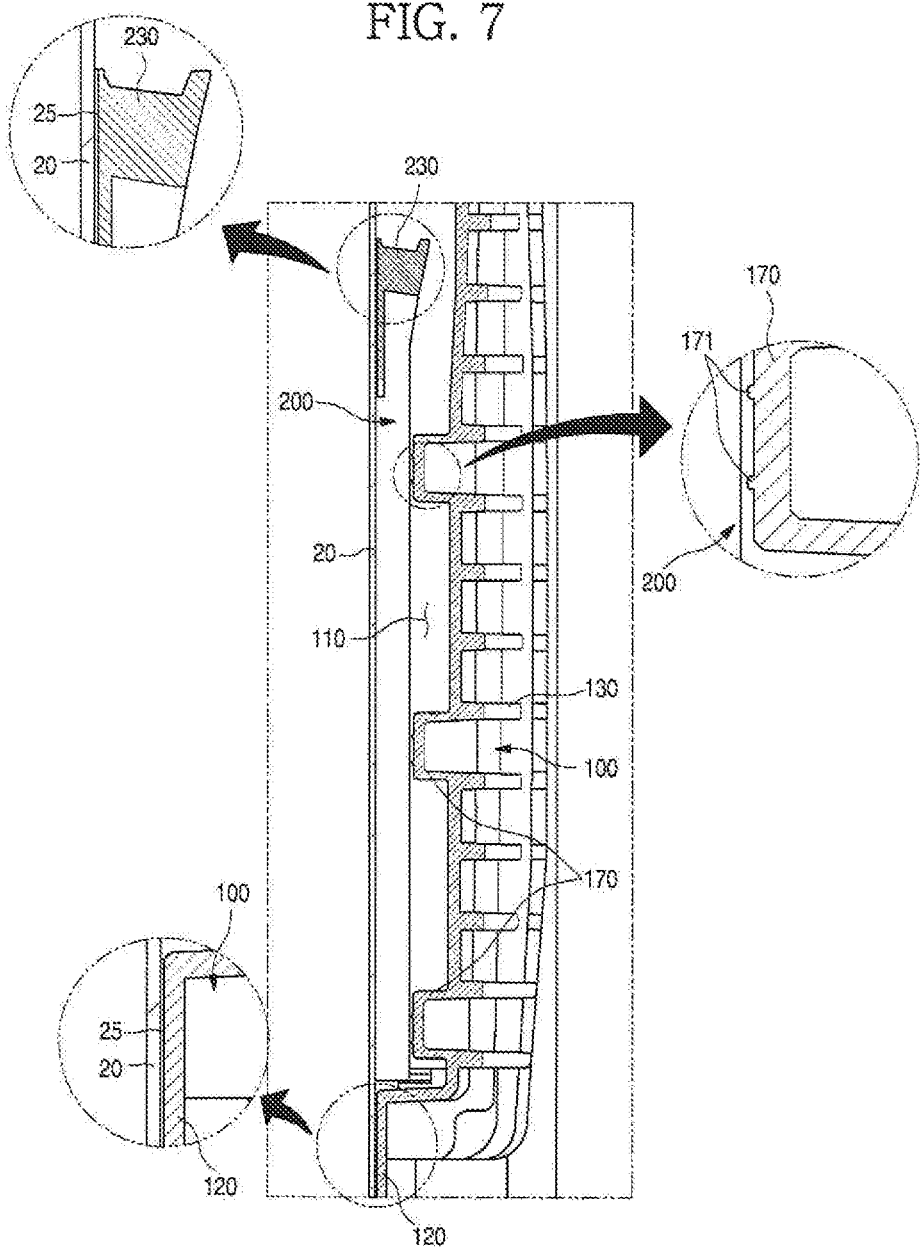
FIG. 7 is a sectional view taken along line 7-7' of FIG. 4.

As illustrated in FIGS. 6 and 7, a front surface and an upper surface of the frame 100 may be open, and a space 110 having an opened upper surface may be formed in the frame 100 when the frame 100 is attached to the front panel 20. To achieve this, a periphery of the frame 100, except for an upper end of the frame 100, may be bent towards the front panel 20, and an end of the frame 100 may be bent to the outside again to form a frame bonding part 120. The frame bonding part 120 may be attached to a bonding member 25 that is formed of a double-sided tape or an adhesive such that the frame 100 may be attached to the rear surface of the front panel 20.

While the frame 100 is attached to the front panel 20, an upper end of the frame 100 may contact a lower surface of the deco member 40. Accordingly, the opened upper surface of the frame 100 may communicate with the insertion hole 41, and accordingly, an independent space may be defined in the interior of the refrigerator door 10.

Even when an expandable liquid is injected into the interior of the refrigerator door 10 to form the insulation member 24, the expandable liquid may not be introduced into the space in the interior of the frame 100. A plurality of reinforcing ribs 130 may be formed on the rear surface of the frame 100 such that they may cross each other longitudinally and transversely, and even when an expandable liquid of high pressure is filled, forming the insulation member 24, the space in the interior of the frame 100 may be maintained by the reinforcing ribs 130.

Plate supports 140 may be formed at left and right ends of an upper side of the frame 100. A support plate 141 may be seated in the plate supports 140. The support plate 141 may be installed in an upper space of the frame 100 corresponding to an upper side of the cover display 200 when the cover display 200 is mounted. The support plate 141 may support the front panel 20 on the rear side. Accordingly, a corresponding portion of the front panel 20 may be prevented from being shaken or deformed by an external impact.

The plate support 140 may be stepped to support opposite ends of the support plate 141. While the frame 100 is attached to the front panel 20, the support plate 141 may be slid and inserted into a space between the plate support 140 and the front panel 20. The support plate 141 may be attached to a rear surface of the front panel 20 when the frame 100 is attached, while opposite ends of the support plate 141 are fixed to the plate support 140.

An electric wire entrance 150 may be formed at an upper portion of a side surface of the frame 100. The electric wire entrance 150 may define a passage through which an electric wire may be inserted to connect electric components provided in the interior of the frame 100 and a power supply on the cabinet. The electric wire entrance 150 may be formed at an upper portion of a side surface of the frame 100 that is close to a hinge and a hinge hole of the refrigerator door 10. When the expandable liquid is injected into the refrigerator door 10, the electric wire entrance 150 may be finished to prevent the expandable liquid from being introduced into the frame 100.

Constraint recesses 160 may be formed on the left and right sides of the fame 100. The constraint recesses 160 may be formed such that constraint parts 230 protruding laterally from the left and right ends of the cover display 200 may be inserted into the constraint recesses 160. The constraint recesses 160 may be recessed outwards and have a shape corresponding to the constraint parts 230, so that the cover display 200 is prevented from being moved and a precise location of the cover display 200 is maintained.

Cover supports 170 that support the cover display 200 may be formed at lower portions of the constraint recesses 160 where the cover display 200 is situated. The cover supports 170 protrude from the left and right surfaces of the frame 100 to push and support the left and right ends of the cover display 200 on the rear side.

Accordingly, if the frame 100 is attached to the front panel 20 and the expandable liquid is injected into the refrigerator door 10 while the cover display 200 is attached to the rear surface of the front panel 20, the cover support 170 may push the cover display 200 forwards such that the cover display 200 remains attached to the front panel 20. In particular, even when the bonding member 25 that attaches the cover display 200 to the front panel 20 is hardened to lose its function, the cover supports 170 may push the cover display 200 such that the front panel 20 and the cover display 200 remain attached to each other.

A plurality of cover supports 170 may be vertically arranged at a predetermined interval to uniformly push and support the whole cover display 200. A protrusion 171 that protrudes forwards may be formed on a front surface of the cover support 170 that is adjacent to the cover display 200. The protrusion 171 may have a rib shape or a boss shape that extends transversely, and may make line or point contact with the cover display 200. Accordingly, the cover display 200 may be prevented from being inclined even though a contact surface between the cover display 200 and the cover support 170 is not uniform, and a uniform pressure may be delivered to the cover display 200 due to the cover supports 170.

The cover display 200 may be a plate formed of plastic, and may be accommodated inside the frame 100 while being mounted on the front panel 20. Constraint parts 230, which protrude outwards and are inserted into the constraint recesses 160, may be formed at upper portions of the left and right ends of the cover display 200.

A plurality of second through-holes 220 may be formed at locations of the cover display 200 which correspond to the display window 11. The second through-holes 220 may guide light irradiated from the LED 320 to the first through-holes 21.

The sizes of the second through-holes 220 may be the same as or larger than the sizes of the first through-holes 21. Accordingly, while the cover display 200 is arranged on the rear surface of the front panel 20, the first through-holes 21 may be situated inside the corresponding second through-holes 220. Further, the first through-holes may have a shape corresponding to the seven segments, and may have various hole shapes for displaying other pieces of information.

The display assembly 300 and the touch sensor assembly 500 may be arranged on the rear surface of the cover display 200. The display assembly 300 may be arranged at a location of the rear surface of the cover display 200 at which the second through-holes 220 are formed. The touch sensor assembly 500 may be arranged at a location of the rear surface of the cover display 200 at which the cover protrusions 210 are formed.

The display assembly 300 may include a display PCB 310 on which the LED 320 is mounted. The LED 320 may be provided at a location corresponding to the second through-holes 220. While the display assembly 310 is arranged on the rear surface of the cover display 200, the LED 320 may be arranged at a location corresponding to the second through-holes 220 to irradiate light towards the second through-holes 220.

The cover protrusions 210 that protrude forwards may be formed at locations of the cover display 200 which correspond to the front panel holes 13. Protrusion holes 211 may be formed in the cover protrusion 210 of the cover display 200. The protrusion holes 211 may pass through the center of the cover protrusions 210. The protrusion holes 211 may define passages to connect the sensor 520 of the touch sensor assembly 500 and the touch plate 12. The touch plate 12 may connect the front panel holes 13 and the sensor 520 through the protrusion holes 211.

The touch sensor assembly 500 may include a touch sensor PCB 510 on which the sensor 520 is mounted. Further, a conductive member 700 may be provided on a front surface of the sensor 520 of the touch sensor PCB 510.

The conductive member 700 may connect the sensor 520 and the touch plate 12 such that a current by static electricity may flow between the sensor and the touch plate 12. The conductive member 700 may be inserted into the protrusion hole 211 and may be formed of a conductive material. The conductive member 700 may be formed of a metal or a conductive synthetic resin.

The conductive member 700 may be fixed to a front surface of the sensor 520. Accordingly, as the conductive member 700 fixed to the front surface of the sensor 520 is inserted into the protrusion hole 211, the touch sensor assembly 500 may be fixed to the rear surface of the cover display 200.

A shape of the conductive member 700 may correspond to a shape of the protrusion hole 211, and may have an outer diameter corresponding to an inner diameter of the protrusion hole 211. The conductive member 700 may fill the protrusion hole 211 when inserted into the protrusion hole 211 to prevent foreign substances from being introduced through the protrusion hole 211.

The touch sensor assembly 500 may be directly mounted on the cover display 200. After the touch sensor assembly 500 is mounted on the cover display 200, the display assembly 300 may be inserted into an interior space of the frame 100 through the insertion hole 41 while being mounted on the frame display 400.

The frame display 400 may have a plate shape. The display PCB 310 may be seated or mounted on the frame display 400. A rim 410 that is bent forwards along a periphery of the frame display 400 may be formed to define a space in which the display PCB 310 may be accommodated. Sliding insertion parts 415 that are bent to the left and right sides are formed on the left and right ends of the frame display 400. The sliding insertion parts 415 may be inserted into guide rails 240 (see FIG. 8) that are formed in the cover display 200. Accordingly, the frame display 400 may be mounted on the cover display 200 by the sliding insertion parts 415.

Reinforcing ribs 411 that are formed at a predetermined interval transversely and longitudinally to define a lattice shape may be formed on the whole front surface of the frame display 400. A frame cutting part 414 may be formed at an upper end of the frame display 400. The frame cutting part 414 may be cut at a location corresponding to the display terminal 311 to have a size corresponding to the size of the display terminal 311, thereby preventing the display terminal 311 and the frame display 400 from interfering with each other.

A boss 413 may be formed in the frame display 400. A screw 312 may be coupled to the boss 413 to fix the display PCB 310. A boss 413 may also be coupled to a screw 312 at a lower side to support the display PCB 310 on the lower side.

A frame handle 420 that extends upwards may be provided at a central portion of an upper end of the frame display 400. The frame handle 420 may be gripped and manipulated by the user when the frame display 400 is coupled to the cover display 200, and may have a predetermined length.

The frame handle 420 may include a first vertical part 421 that extends from the frame display 400, an inclined part 422 that extends from an upper end of the first vertical part 421 to be inclined rearwards, and a second vertical part 423 that extends from an upper end of the inclined part 422 upwards again. The first vertical part 421 and the second vertical part 423 may extend in parallel and may be connected by the inclined part 422. A grip part 424, configured to be gripped by the user, may be formed at an upper end of the second vertical part 423 to extend transversely.

Accordingly, when the frame display 400 is inserted, it may be inserted into the insertion hole 41 from a lower end of the frame display 400 while the grip part 424 is gripped. As the frame display 400 is inserted downwards, the frame display 400 may be easily adhered to the rear surface of the cover display 200 due to the structure of the frame handle 420.

If the insertion hole cover 42 is closed while the frame display 400 is completely inserted, the insertion hole cover 42 may contact the grip part 424. Although not illustrated, because a handle coupling part having a shape corresponding to the grip part 424 is formed on a lower surface of the insertion hole cover 42, an upper end of the frame handle 420 may be coupled to the handle coupling part to remain fixed when the insertion hole cover 42 is closed.

The touch sensor PCB 510 may be formed separately from the display PCB 310, and may be spaced apart from the display PCB 310. The touch sensor PCB 510 and the display PCB 310 may be connected to each other by a cable connector 600.

The cable connector 600 may include a first cable connector 610 connected to the touch sensor PCB 510 and a second cable connector 620 connected to the display PCB 310. The first cable connector 610 and the second cable connector 620 may be connected to each other when mounting the display assembly 300 on the refrigerator door 10 while the first cable connector 610 and the second cable connector 620 are connected to the touch sensor PCB 510 and the display PCB 310, respectively. The whole length of the cable connector 600 may be larger than a distance from the touch sensor assembly 500 to the insertion hole 41 so that the display assembly 300 may be mounted after the touch assembly 500 is connected to the cover display 200 via the insertion hole 41.

Referring to FIGS. 8-11, the cover display 200 may be situated on the rear surface of the front panel 20. The cover protrusions 210 of the cover display 200 may be inserted into and mounted in the front panel holes 13 of the front panel 20. Accordingly, the cover display 200 may be firmly arranged so as not to be moved from the rear surface of the front panel 20.

While the cover protrusions 210 are inserted Into the front panel holes 13, the first through-holes 21 of the front panel 20 and the corresponding second through-holes 220 of the cover display 200 may communicate with each other at the corresponding locations. The first through-holes 21 may be situated inside the corresponding through-holes 220 so that light irradiated from the LED 320 may be stably emitted to the outside.

The cover protrusion 210 may protrude forwards, and the forward protrusion may have a thickness corresponding to the thickness of the front panel 20. Accordingly, while the cover protrusions 210 are completely inserted into the front panel holes 13, front surfaces of the cover protrusions 210 may be exposed to the outside of the front panel 20 through the front panel holes 13. The front surfaces of the cover protrusions 210 may be situated on the same plane as the front surface of the front panel 20.

The touch plate 12 may be smaller than the front panel holes 13 and inserted into the front panel holes 13. When the front panel holes 13 are circular, the outer diameter of the touch plates 12 may be smaller than the inner diameter of the front panel holes 13. The touch plates 12 may be larger than the size of the protrusion holes 211 to be seated on or in the front surfaces of the cover protrusions 210.

A touch plate seating part 212, in which the touch plate 12 is accommodated and seated, may be formed on the front surface of the cover protrusion 210. The touch plate seating part 212 may be recessed at the center of the front surface of the cover protrusion 210 to have a size and a shape corresponding to the touch plate 12. The touch plate seating part 212 may be recessed to have a shape corresponding to a shape of the touch plate 12 and have a thickness corresponding to a depth of the touch plate 12.

When the touch plate 12 is seated in the touch plate seating part 212, the touch plate 12 may be situated on the rear side of the front panel hole 13. Further, the front surface of the touch plate 12 may be situated on the same plane as the front surface of the front panel 20.

If the touch plate 12 is seated in the touch plate seating part 212, the touch plate 12 may have the same central axis as that of the front panel hole 13. The center of the touch plate 12 may pass through an axis that passes through the center of the front panel hole 13. While the touch plate 12 is inserted into the front panel hole 13, an outer peripheral surface of the touch plate 12 may be spaced apart from an inner peripheral surface of the front panel hole 13.

According to the structure, because the front surface of the front panel 20, the front surface of the cover protrusion 210, and the front surface of the touch plate 12 are formed on the same plane, the cover protrusion 210 may constitute a front external appearance having an integral feeling. Because the touch plate 12 is smaller than the front panel hole 13 and the cover protrusion 210 has a size corresponding to a size of the front panel hole 13, at least a portion of the front surface of the cover protrusion 210 may be exposed to the outside through the front panel hole 13. A front periphery of the cover protrusion 210 corresponding to the outside of the touch plate seating part 212 may be exposed to the outside through the front panel hole 13.

The front surface of the cover protrusion 210 exposed to the outside through the front panel hole 13 may define a border of the front panel 20 and the touch plate 12. Accordingly, the user may easily recognize a touch area due to the cover protrusion 210 exposed to the outside. The front surface of the cover protrusion 210 exposed to the outside may be colored so that the user may recognize a touch area more easily.

The touch sensor assembly 500 may be arranged on the rear surface of the cover display 200. The sensor 520 may be mounted on the touch sensor PCB 510. The sensor 520 may correspond to the protrusion hole 211 in the touch sensor PCB 510, and may be situated such that the center of the sensor 520 is positioned at the center of the protrusion hole 211. The sensor 520, the cover protrusion 210, and the touch plate 12 may be arranged at corresponding locations such that they have the same central axis.

The conductive member 700 may be situated in the interior of the protrusion hole 211. Further, the conductive member 700 may contact the touch plate 12 and the sensor 520 so that a current due to static electricity may flow between the touch plate 12 and the sensor 520.

The conductive member 700 may have an outer peripheral surface corresponding to an inner peripheral surface of the protrusion hole 211 and may have a shape and a size corresponding to the protrusion hole 211 to fill the protrusion hole 211. Accordingly, foreign substances may be prevented from being introduced through the protrusion hole 211.

The conductive member 700 may have a thickness corresponding to the forward/rearward thickness of the protrusion hole 211. While the touch plate 12 is seated in the touch plate seating part 212, the front surface of the conductive member 700 may contact the touch plate 12. When the conductive member 700 is situated in the protrusion hole 211, the touch plate 12 may contact the conductive member 700 such that the sensor 520 may be charged. If the cover protrusion 210 of the cover display 200 is inserted into the front panel hole 13 and the touch plate 12 is seated in the touch plate seating part 212, the front surface of the touch plate 12 is situated on the same plate as the front surface of the front panel 20.

The sensor 520 may be situated on the rear side of the cover display 200 at a location corresponding to the protrusion hole 211. The conductive member 700 may pass through the protrusion hole 211 and connect the touch plate 12 and the sensor 520 such that a current by static electricity may flow between the touch plate 12 and the sensor 520. If the user touches the touch plate 12, the sensor 520 may recognize a touch of the touch plate 12 by static electricity.

In the above embodiment, the touch sensor assembly 500 may be directly mounted on the rear surface of the cover display 200, and the display assembly 300 may be inserted into the interior space of the frame 100 while being mounted on the frame display 400. The touch sensor assembly 500 and the display assembly 300 may be inserted into the interior space of the frame 100 after being mounted on the frame display 400 together. Hereinafter, an embodiment in which the touch assembly 500 and the display assembly 300 are mounted on the frame display 400 together will be described in detail.

Figure 12:
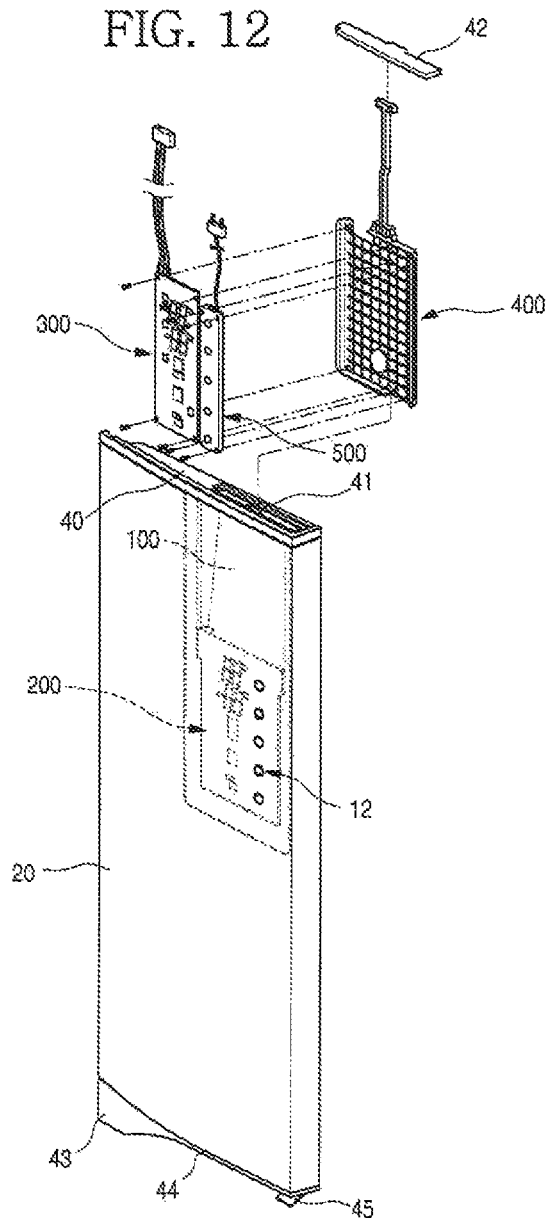
FIG. 12 is an exploded perspective view illustrating a mounting structure of a display assembly and a touch sensor assembly of the refrigerator door according to another embodiment of the present disclosure.
Figure 13:
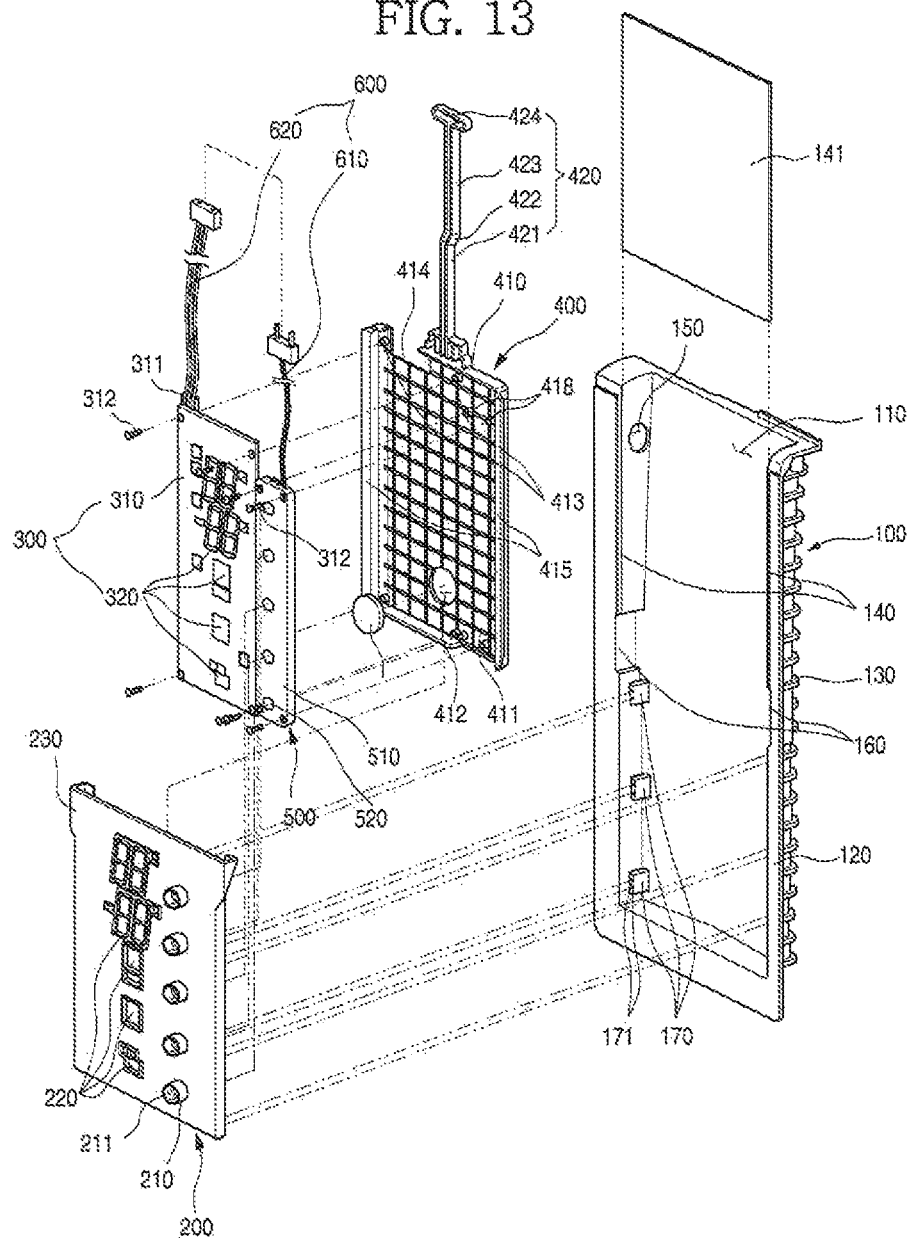
FIG. 13 is an exploded perspective view illustrating that the front panel of the refrigerator door according to the embodiment of FIG. 12 is separated.

Referring to FIGS. 12 and 13, the remaining configurations, except for the configuration in which the touch assembly 500 and the display assembly 300 are mounted on the frame display 400 together, are the same as those of the above-described embodiments. Accordingly, the same configurations will be denoted by the same reference numerals, and a description of the same configurations will be omitted.

A frame 100 may be attached to a rear surface of the front panel 20. The frame 100 may provide a separate space that is not filled with the expandable liquid in the interior of the refrigerator door 10, and provide a space in which a cover display 200, a display assembly 300, a touch sensor assembly 500, and a frame display 400 are accommodated. The deco members 40 and 43 may define upper and lower external appearances of the refrigerator door 10, and may be configured to shield opened upper and lower ends of the refrigerator door 10, which are formed when the front panel 20 and the door liner 30 are coupled to each other.

An insertion hole 41 and an insertion hole cover 42 that opens and closes the insertion hole 41 may be provided in the upper deco member 40 of the refrigerator door 10. The insertion hole 41 may pass through the deco member 40, and may be communicated with a space in which the frame 100 is formed. The insertion hole 41 may have a size that is large such that the frame display 400 may be inserted through the insertion hole 41, and may be situated on a vertically upper side of the cover display 400.

The cover display 200 may be mounted on a rear surface of the front panel 20. The cover display 200 may guide mounting of the display assembly 300 and the touch sensor assembly 500. A cover protrusion 210 that protrudes forwards may be formed in the cover display 200, and the cover protrusion 210 may be inserted into the front panel hole 13 formed in the front panel 20.

While the cover protrusion 210 is inserted into the front panel 13, the cover display 200 may be positioned at an intended precise location of the rear surface of the front panel 20. The cover protrusion 210 and the front panel hole 13 may guide a mounting location of the cover display 200.

A precise location of the cover display 200 may refer to a location at which a second through-hole 220 formed in the display 200 is precisely aligned with a first through-hole 21 formed in the front panel 20. The first through-hole 21 may be arranged inside the second through-hole 220 to be aligned with the second through-hole 220 such that light irradiated from the LED 320 of the display assembly 300 is emitted to the outside without being blocked. The touch sensor assembly 500 and the display assembly 300 may be inserted into the interior space of the frame 100 after being mounted on the frame display 400 together.

The frame display 400 may have a plate shape, in which the touch sensor assembly 500 and the display assembly 300 may be seated. A rim 410 that is bent forwards along a periphery of the frame display 400 may be formed to define a space, in which the touch sensor PCB 510 and the display PCB 310 may be accommodated.

A boss 413 may be formed in the frame display 400, to which a screw 312 may be coupled to fix the display PCB 310. A sensor coupling boss 418 may be formed in the frame display 400, to which a screw 312 may be coupled to fix the sensor PCB 510. The touch sensor assembly 500 and the display assembly 300 may be fixedly mounted on the frame display 400 by the screw 312.

Sliding insertion parts 415 that are bent to the left and right sides may be formed on the left and right ends of the frame display 400. The sliding insertion parts 415 may be inserted into guide rails 240 (see FIG. 8) that are formed in the cover display 200. The frame display 400 may be mounted on the cover display 200 by the sliding insertion parts 415 after being inserted into the insertion hole 41. If the frame display 400 is completely inserted, the touch sensor assembly 500 and the display assembly 300 may be situated on the rear side of the cover display 200.

The display assembly 300 may be situated on the rear side of the cover display 200. The LED 320 may correspond to the second through-hole 220 of the cover display 200, and light irradiated by the LED 320 may pass through the second through-hole 220 and the first through-hole 21 of the display window 11 to be irradiated to the outside.

The sensor 520 mounted on the touch sensor assembly 500 may correspond to the protrusion hole 211. The sensor 520 may be situated on the rear side of the cover display 200 at a location corresponding to the front panel hole 13. The sensor 520 may be positioned on a straight line together with the touch plate 12 provided in the front panel hole 13. The sensor 520 may be connected to the touch plate 12 through the protrusion hole 211.

Figure 14:
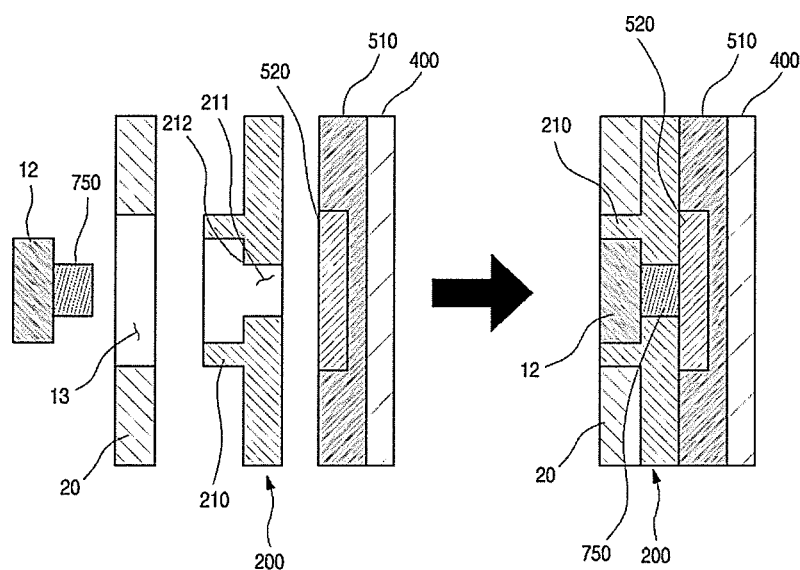
FIG. 14 is a view schematically illustrating structures of the touch plate, the front panel, the cover display, and the touch sensor assembly before and after assembly thereof according to the embodiment of FIG. 12.

Referring to FIG. 14, conductive member 750 may be provided on the rear surface of the touch plate 12, which faces the sensor 520. The conductive member 750 may connect the sensor 520 and the touch plate 12 such that a current by static electricity may flow between the sensor 520 and the touch plate 12.

The conductive member 750 may be inserted into the protrusion hole 211 and may be formed of a conductive material such as a metal or a conductive synthetic resin. The conductive member 750 may be provided in the touch plate 12, and when the touch plate 12 is formed of a metal, the conductive member 750 may be integrally formed with the touch plate 12.

A shape of the conductive member 750 may correspond to a shape of the protrusion hole 211, and may have an outer diameter corresponding to an inner diameter of the protrusion hole 211. Accordingly, the conductive member 750 may fill the protrusion hole 211 when inserted to prevent foreign substances from being introduced through the protrusion hole 211. If the cover protrusion 210 of the cover display 200 is inserted into the front panel hole 13 and the touch plate 12 is seated in the touch plate seating part 212, the front surface of the touch plate 12 may be situated on the same plane as the front surface of the front panel 20.

The sensor 520 may be situated on the rear side of the cover display 200 at a location corresponding to the protrusion hole 211. The conductive member 750 may pass through the protrusion hole 211 and connect the touch plate 12 and the sensor 520 such that a current by static electricity may flow between the touch plate 12 and the sensor 520. As the user touches the touch plate 12, the sensor 520 may recognize a touch of the touch plate 12 by static electricity.

Figure 15:
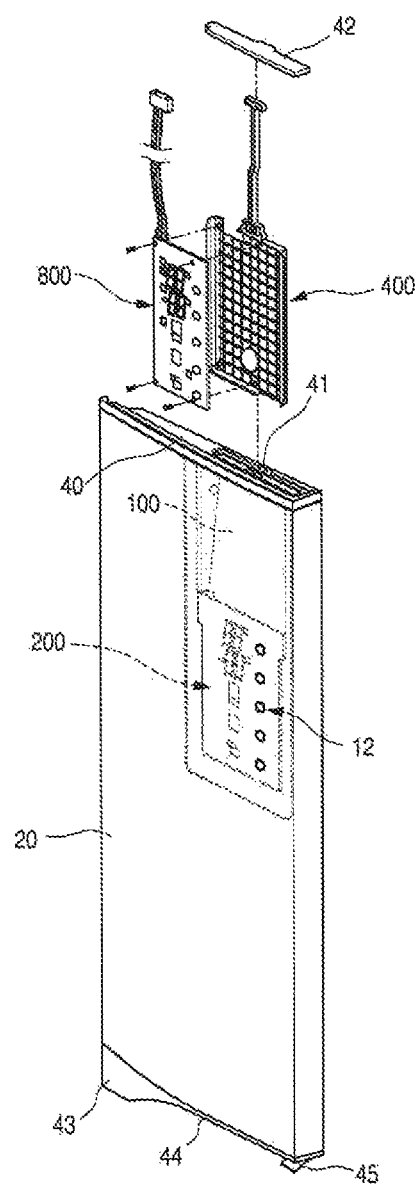
FIG. 15 is an exploded perspective view illustrating a mounting structure of an integrated sensor assembly of the refrigerator door according to another embodiment of the present disclosure.
Figure 16:
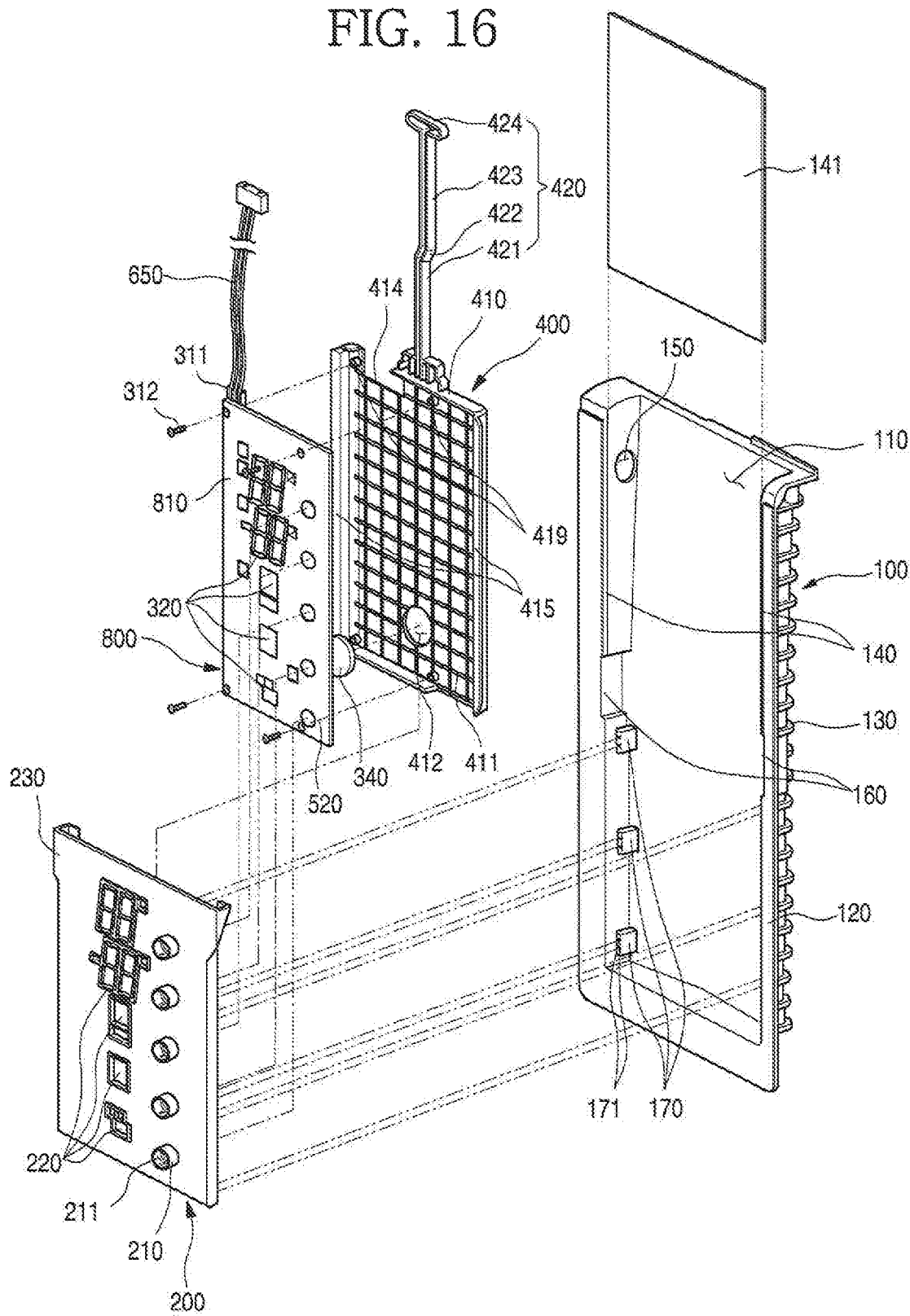
FIG. 16 is an exploded perspective view illustrating that the front panel of the refrigerator door according to the embodiment of FIG. 15 is separated.

Referring to FIGS. 15 and 16, the display assembly 300 and the touch sensor assembly 500 may be integrally formed to be provided as one integrated sensor assembly 800. The display PCB 310 and the touch sensor PCB 510 may not be separately formed but may be provided as one integrated PCB 810. The cable connector 600 including the first cable connector 610 and the second cable connector 620 may be provided as an integrated cable connector 650.

The integrated sensor assembly 800 may be inserted into the interior space of the frame 100 through the insertion hole 41 while being mounted on the frame display 400. The same configurations as those of the above-described embodiments, except for the configuration in which the integrated PCB 810 and the integrated cable connector 650, will be denoted by the same reference numerals, and a detailed description of the same configurations will be omitted.

The present disclosure may include a plate shape in which the integrated sensor assembly 800 may be seated. A rim 410 that is bent forwards along a periphery of the frame display 400 may be formed to define a space in which the integrated sensor assembly 800 is accommodated. Sliding insertion parts 415 that are bent to the left and right sides are formed on the left and right ends of the frame display 400. The sliding insertion parts 415 may be inserted into guide rails 240 (FIG. 8) that are formed in the cover display 200. Accordingly, the frame display 400 may be mounted on the cover display 200 by the sliding insertion parts 415.

An integrated sensor coupling boss 419 may be formed in the frame display 400, to which a screw 312 may be coupled to fix the integrated PCB 810. The integrated sensor assembly 800 may be fixedly mounted on the frame 400 by the screw 312.

If the frame display 400 is completely inserted, the integrated sensor assembly 800 may be situated on the rear side of the cover display 200, and light irradiated by the LED 320 may be irradiated to the outside via the cover display 200 and the display window 11. The LED 320 may be situated to correspond to the second through-hole 220 of the cover display 200, and light irradiated by the LED 320 may pass through the second through-hole 220 and the first through-hole 21 of the display window 11 to be irradiated to the outside.

The sensor 520 mounted on the touch sensor assembly 810 may correspond to the protrusion hole 211. The sensor 520 may be situated inside the cover display 200 at a location corresponding to the front panel hole 13. Accordingly, the sensor 520 may be positioned on a straight line together with the touch plate 12 included in the front panel hole 13. The sensor 520 may be connected to the touch plate 12 through the protrusion hole 211.

Because a mounting location of the cover display is guided by the front panel holes formed in the front panel and the cover protrusions formed in the cover display, the cover display may be easily arranged at a precise location of the rear surface of the front panel and deviation of the arrangement location of the cover display may be minimized. Further, because the cover protrusions are inserted into the front panel holes, the first through-holes and the second through-holes are aligned with each other at corresponding locations. Accordingly, because the centers of the first through-holes and the second through-holes may be prevented from being deviated, light irradiated from the light emitting member may be uniformly emitted to the front side of the front panel through the first through-holes.

The touch plates provided on the front surface of the cover protrusions may be connected to the sensors provided inside the door through the protrusion holes formed in the cover protrusions such that the sensors are changed. Accordingly, when the touch plate is touched, the sensor may detect a touch.

Figure 9:
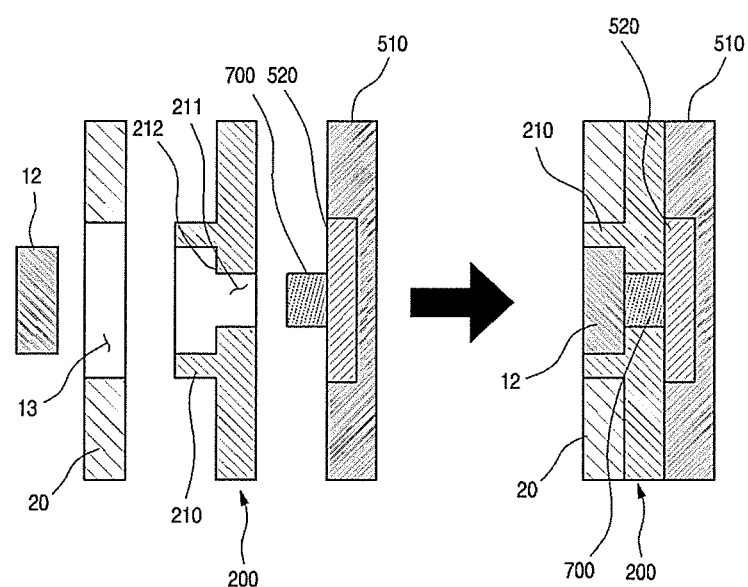
FIG. 9 is a view schematically illustrating structures of the touch plate, the front panel, the cover display, and the touch sensor assembly before and after assembly thereof according to an embodiment of the present disclosure.
Figure 10:
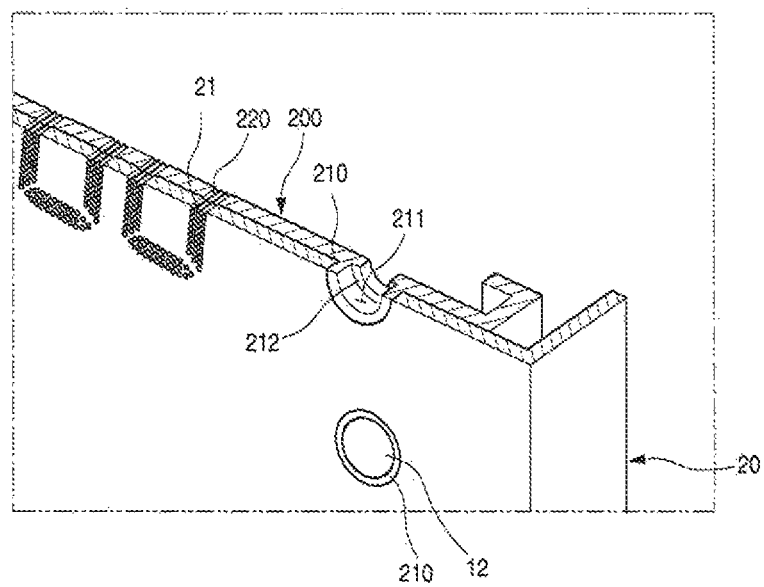
FIG. 10 is a cutaway perspective view illustrating a coupling structure of the front panel and the cover display in FIG. 8.
Figure 11:
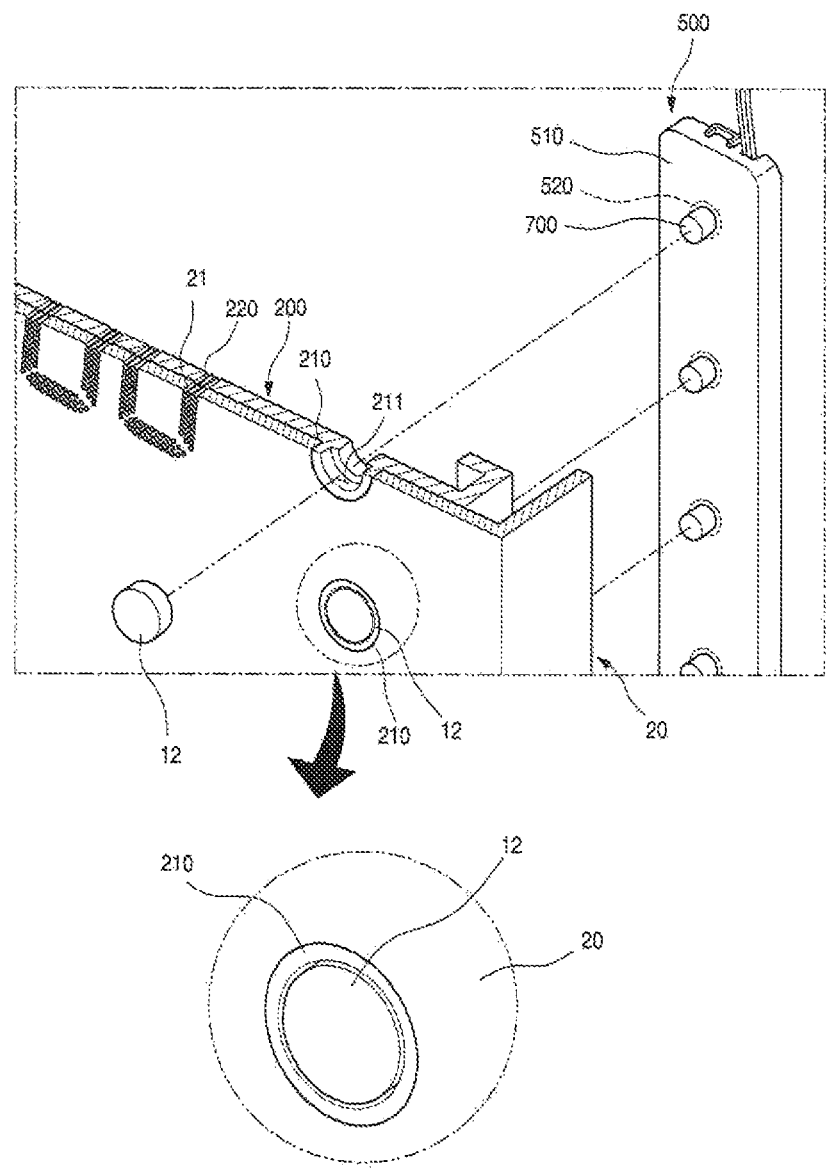
FIG. 11 illustrates a coupling structure of the touch plate and the touch sensor assembly in FIG. 10.

The touch plate and the front panel are formed of the same metal material to provide an external appearance having an integral feeling. As shown in FIGS. 9-11, the conductive members that connect the touch plates to the protrusion holes such that the touch plates and the sensors are charged have the size and shape (e.g., a cross-sectional area and a cross-section shape) corresponding to or matching those of the protrusion holes to bury the protrusion holes. The protrusion holes may surround the touch plates. Accordingly, foreign substances may be prevented from being introduced through the protrusion holes.

Because the cover protrusions have a thickness corresponding to the thickness of the front panel, the front surfaces of the cover protrusions may be located on the same plane as the front surface of the front panel when the cover protrusions are inserted into the front panel holes. Further, the front surfaces of the touch plates, which are seated in the touch plate seating parts formed on the front surfaces of the cover protrusions, also are located on the same plane as the front surface of the front panel. Accordingly, the front panel, the touch plates, and the cover protrusions provide an integral feeling, and may provide an appealing external appearance. The cover protrusion may be surrounded by the front panel hole, as shown in FIG. 9.

Because the touch plates are smaller than the front panel holes, the front surfaces of the cover protrusions are exposed to the outside. Accordingly, the user may recognize a touch area more easily by using the spaced spaces of the touch plates and the front panel holes and the cover protrusions exposed to the outside, and accordingly, convenience of use may be improved.

Because the outer peripheral surfaces of the cover protrusions contact the inner peripheral surfaces of the front panel holes (i.e., the inner peripheral surfaces of the front panel that define the front panel holes, as shown in FIGS. 9-11), the cover display may be prevented from being shaken so that the first through-hole and the second through-hole may be aligned with each other at a more precise location. Accordingly, light emitted to the front side of the front panel through the first through-holes may become uniform.

A refrigerator may include a cover display in which a first through-hole, through which light of a light emitting member passes, is formed in a front panel and a second through-hole, which is communicated with the first through-hole to guide the light of the light emitting member, is formed on a rear surface of the front panel, wherein the first through-hole and the second through-hole are aligned with each other at a precise location.

The refrigerator may include a manipulation part that is touched by the user for use of the refrigerator and a sensor detects static electricity generated when the manipulation part is touched. The refrigerator may allow the user to easily recognize a manipulation part and in which the user may feel as though the manipulation part was integral with a front surface of a door.

A refrigerator may include a door, a front panel that defines an external appearance of the door and is formed of a metal, a front panel hole that is formed in the front panel, a cover display that is provided on a rear surface of the front panel, a cover protrusion that extends from the cover display to an inside of the front panel hole, a touch plate that is mounted on the cover protrusion, is exposed through the front panel hole, and is formed of a metal, and a capacitive touch sensor that is arranged on a rear side of the cover display and is connected to the touch plate such that a current flows between the touch sensor and the touch plate, wherein the touch plate has a size that is smaller than a size of the front panel hole and is spaced apart from an inner peripheral surface of the front panel hole, and the cover protrusion is formed along an inner circumference of the front panel hole to divide a section between the touch plate and the front panel.

A touch plate seating part an inner area of which, except for a periphery of the touch plate seating part, is recessed may be formed on a front surface of the cover protrusion, and the touch plate may be seated in the touch plate seating part. While the touch plate may be seated in the touch plate seating part, a front surface of the touch plate and a front surface of the front panel may be situated on the same plane.

A front surface of the cover protrusion, which is exposed between the touch plate and the front panel, may be situated on the same plane as the plane on which the front panel is situated. A front surface of the cover protrusion, which is exposed between the touch plate and the front panel, may be colored to define a border between the front panel and the touch plate. The front panel and the touch plate may be formed of the same material.

A protrusion hole that passes through the cover plate may be formed in the cover protrusion, and a conductive member that connects the touch plate and the touch sensor such that a current flows between the touch plate and the touch sensor may be provided in the protrusion hole. The conductive member may have a size and a shape that correspond to a size and a shape of the protrusion hole to bury the protrusion hole. The touch plate and the conductive member may be integrally formed.

The refrigerator may further include a light emitting member that is arranged on a rear side of the cover display inside the door, a display window that is formed on one side of the front panel, which is spaced apart from the front panel hole and includes a set of fine first through-holes, through which light of the light emitting member passes, and a plurality of second through-holes that is formed in the cover display to guide the light of the light emitting member to the display window, and while the cover protrusion is inserted into the front panel hole, the first through-holes and the corresponding second through-holes are aligned with each other. An integrated PCB, on which the touch sensor together with the light emitting member are mounted, may be provided on a rear side of the cover display.

A sensor PCB, on which the touch sensor is mounted, and a display PCB, on which the light emitting member is mounted, may be provided on a rear side of the cover display. While the sensor PCB and the display PCB are provided on a rear side of the cover display, the touch sensor may be situated to correspond to the front panel hole and the light emitting member may be situated to correspond to the second through-holes.

A plate-shaped frame display, which is mounted to be slid, may be provided in the cover display, the display PCB may be mounted on the frame display, and the sensor PCB may be mounted on a rear surface of the cover display. A plate-shaped frame display, which is mounted to be slid, may be provided in the cover display, and the sensor PCB and the display PCB may be mounted on the frame display together. A plurality of cover protrusions may be arranged to be spaced apart from each other, and the number of the front panel holes may correspond to the number of the cover protrusions such that the front panel holes are situated at locations correspond to the cover protrusions.

In particular, a side-by-side type refrigerator will be exemplified for convenience of description and understanding in the embodiments of the present disclosure, and the present disclosure may be applied to home appliances that may equipped with a touch sensor assembly as well as all types of refrigerators.

This application relates to U.S. application Ser. No. 14/931,776 filed on Nov. 3, 2015, and U.S. application Ser. Nos. 14/977,572, 14/977,588, 14/977,605, 14/977,615, and 14/977,623, all filed on Dec. 21, 2015, which are hereby incorporated by reference in their entirety. Further, one of ordinary skill in the art will recognize that features disclosed in these above-noted applications may be combined in any combination with features disclosed herein Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
    a door,
    a front panel that includes the outermost surface of the door and is formed of a metal, the front panel including a front panel hole that is formed through the front panel;
    a display cover that is provided on a rear surface of the front panel and having a cover protrusion that extends from a first surface of the display cover and is inserted into the front panel hole, the cover protrusion having a touch plate seating part that is recessed from a front surface of the cover protrusion;
    a touch plate that is seated in the touch plate seating part formed by the cover protrusion, is exposed through the front panel hole, and is formed of a metal;
    a capacitive touch sensor that is arranged on a rear side of the display cover and is coupled to the touch plate;
    a protrusion hole formed through the display cover to communicate with the touch plate seating part; and
    a conductive material provided in the protrusion hole that connects the touch plate and the touch sensor such that a current flows between the touch plate and the touch sensor, wherein the touch plate has a smaller size than the front panel hole and is spaced apart from an inner peripheral surface of the front panel hole, and the cover protrusion is formed along an inner circumference of the front panel hole to separate the touch plate from the front panel.

2. The refrigerator of claim 1, wherein, while the touch plate is seated in the touch plate seating part, a front surface of the touch plate and a front surface of the front panel are situated on the same plane.

3. The refrigerator of claim 2, wherein the front surface of the cover protrusion, which is exposed between the touch plate and the front panel, is situated on the same plane as the plane on which the front panel is situated.

4. The refrigerator of claim 1, wherein the front surface of the cover protrusion, which is exposed between the touch plate and the front panel, is colored to define a border between the front panel and the touch plate.

5. The refrigerator of claim 1, wherein the front panel and the touch plate are formed of the same material.

6. The refrigerator of claim 1, wherein the conductive material has a cross-sectional area and a cross-sectional shape that matches a cross-sectional area and a cross-sectional shape of the protrusion hole to fill the protrusion hole.

7. The refrigerator of claim 1, wherein the touch plate and the conductive material are integrally formed.

8. The refrigerator of claim 1, further including:
    a light source that is arranged on a rear side of the display cover inside the door;
    a display window that is formed on one side of the front panel, which is spaced apart from the front panel hole and comprises a set of fine first through-holes through which light of the light source passes; and
    a plurality of second through-holes that is formed in the display cover to guide the light of the light source to the display window, wherein while the cover protrusion is inserted into the front panel hole, the first through-holes and the corresponding second through-holes are aligned with each other.

9. The refrigerator of claim 8, wherein the touch sensor and the light source are mounted on an integrated PCB that is provided on a rear side of the display cover.

10. The refrigerator of claim 8, wherein a sensor PCB, on which the touch sensor is mounted, and a display PCB, on which the light source is mounted, are provided on a rear side of the display cover.

11. The refrigerator of claim 10, wherein the sensor PCB and the display PCB are arranged such that the touch sensor is aligned with the front panel hole and the light source is aligned with the second through-holes.

12. The refrigerator of claim 11, wherein the display PCB is mounted to a plate-shaped frame display, which is configured to be slid relative to the display cover, and the sensor PCB is mounted on a rear surface of the display cover.

13. The refrigerator of claim 11, wherein a plate-shaped frame display is configured to be slid in the display cover, and the sensor PCB and the display PCB are directly mounted on the frame display.

14. The refrigerator of claim 1, wherein a plurality of cover protrusions are arranged to be spaced apart from each other, a plurality of front panel holes are formed in the front panel, and the number of the front panel holes corresponds to the number of the cover protrusions such that each front panel hole is positioned at a location matching to a corresponding cover protrusion so as to allow the matching cover protrusion to be surrounded by the corresponding front panel hole.

* * * * *